United States Patent
O'Loughlin et al.

(10) Patent No.: US 12,342,963 B2
(45) Date of Patent: Jul. 1, 2025

(54) MICRO PUREE MACHINE

(71) Applicants: SharkNinja Operating LLC, Needham, MA (US); SharkNinja (Hong Kong) Company Limited, Hong Kong (CN)

(72) Inventors: Nicholas Michael O'Loughlin, Lantau Island (HK); Michelle Hilary Power, London (GB); Xu Sheng Deng, Huizhou (CN); Ting Hua Zhang, Shenzhen (CN); Pushan He, Shenzhen (CN); Ping Chu, Kowloon (HK)

(73) Assignees: SharkNinja Operating LLC, Needham, MA (US); SharkNinja (Hong Kong) Company Limited, Hong Kong (CN)

( * ) Notice: Subject to any disclaimer, the term of this patent is extended or adjusted under 35 U.S.C. 154(b) by 0 days.

(21) Appl. No.: 18/671,839

(22) Filed: May 22, 2024

(65) Prior Publication Data

US 2024/0341537 A1 Oct. 17, 2024

Related U.S. Application Data

(63) Continuation of application No. 17/374,435, filed on Jul. 13, 2021, now Pat. No. 12,016,496, which is a
(Continued)

(51) Int. Cl.
*A47J 43/07* (2006.01)
*A47J 43/044* (2006.01)
(Continued)

(52) U.S. Cl.
CPC ......... *A47J 43/0755* (2013.01); *A47J 43/044* (2013.01); *A47J 43/0711* (2013.01);
(Continued)

(58) Field of Classification Search
CPC .. A47J 43/044; A47J 43/0755; A47J 43/0772; A23G 9/224
See application file for complete search history.

(56) References Cited

U.S. PATENT DOCUMENTS 9,993,016 B1 * 6/2018 Dyer .................. A23G 9/224
2018/0078094 A1 * 3/2018 Haney ................ A47J 43/0761

\* cited by examiner

*Primary Examiner* — Elizabeth Insler
(74) *Attorney, Agent, or Firm* — The Webb Law Firm

(57) ABSTRACT

A micro puree machine including a housing, a power shaft, a bowl assembly and a platform. The power shaft extends from the housing. The bowl assembly including at least one locking bowl element. The platform includes at least one complementary locking platform element that is configured to engage the at least one locking bowl element such that rotation of the bowl assembly relative to the platform is prevented at times the bowl assembly is positioned thereon. The platform is rotatable from a first position to a second position relative to the housing such that the platform raises the bowl assembly towards the power shaft during the rotation of the bowl assembly and platform. The raising of the bowl assembly facilitates connection between the power shaft and a blade assembly that is positioned in a lid assembly on the bowl assembly. A blade assembly detection system detects proper positioning of the blade assembly within the lid assembly.

10 Claims, 42 Drawing Sheets

Related U.S. Application Data continuation-in-part of application No. 17/139,681, filed on Dec. 31, 2020, now Pat. No. 12,064,056.

(51) Int. Cl.
    *B02C 25/00*     (2006.01)
    *G01D 5/14*     (2006.01)

(52) U.S. Cl.
    CPC ........... *A47J 43/0727* (2013.01); *B02C 25/00* (2013.01); *G01D 5/145* (2013.01); *A47J 2043/04472* (2013.01)

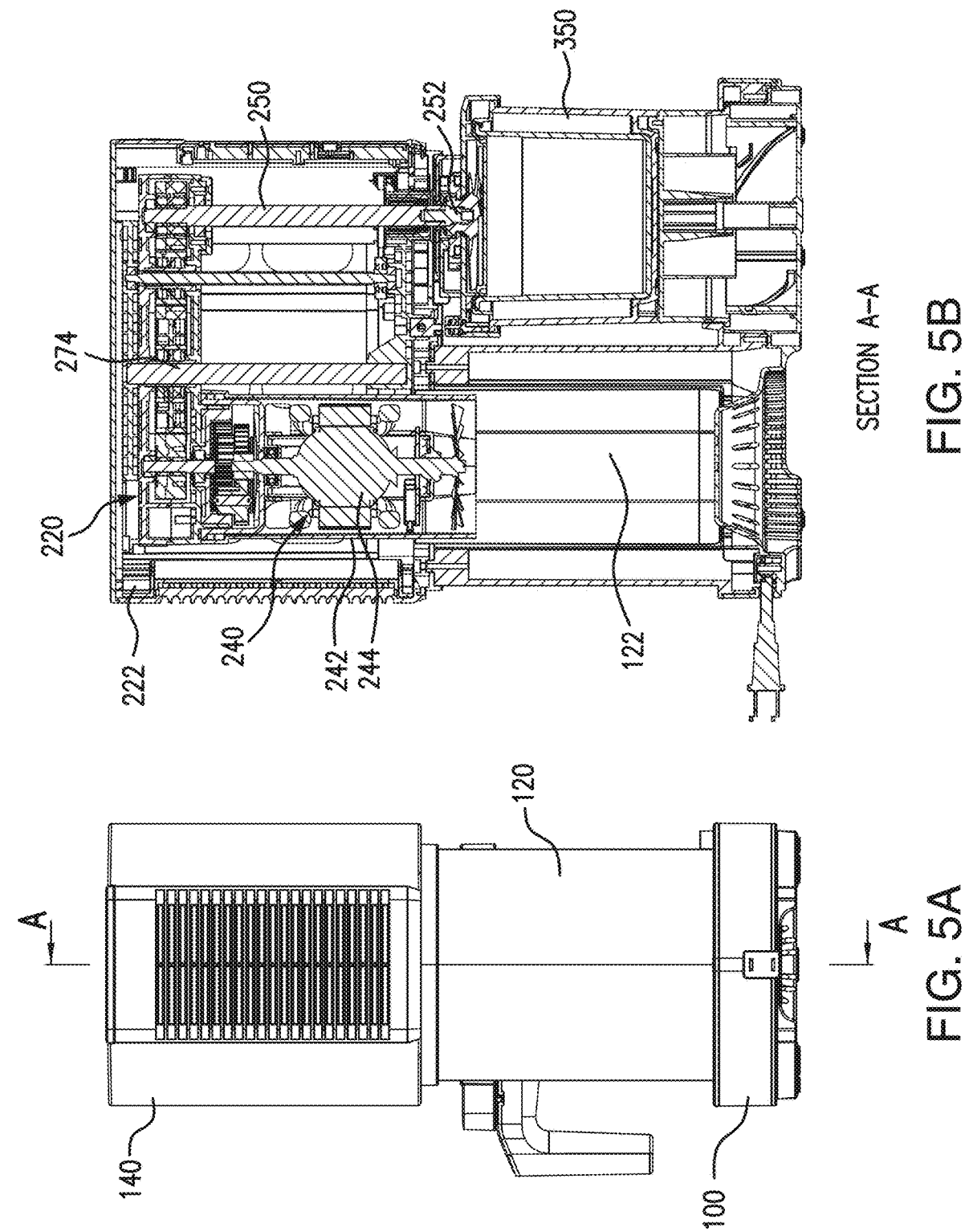

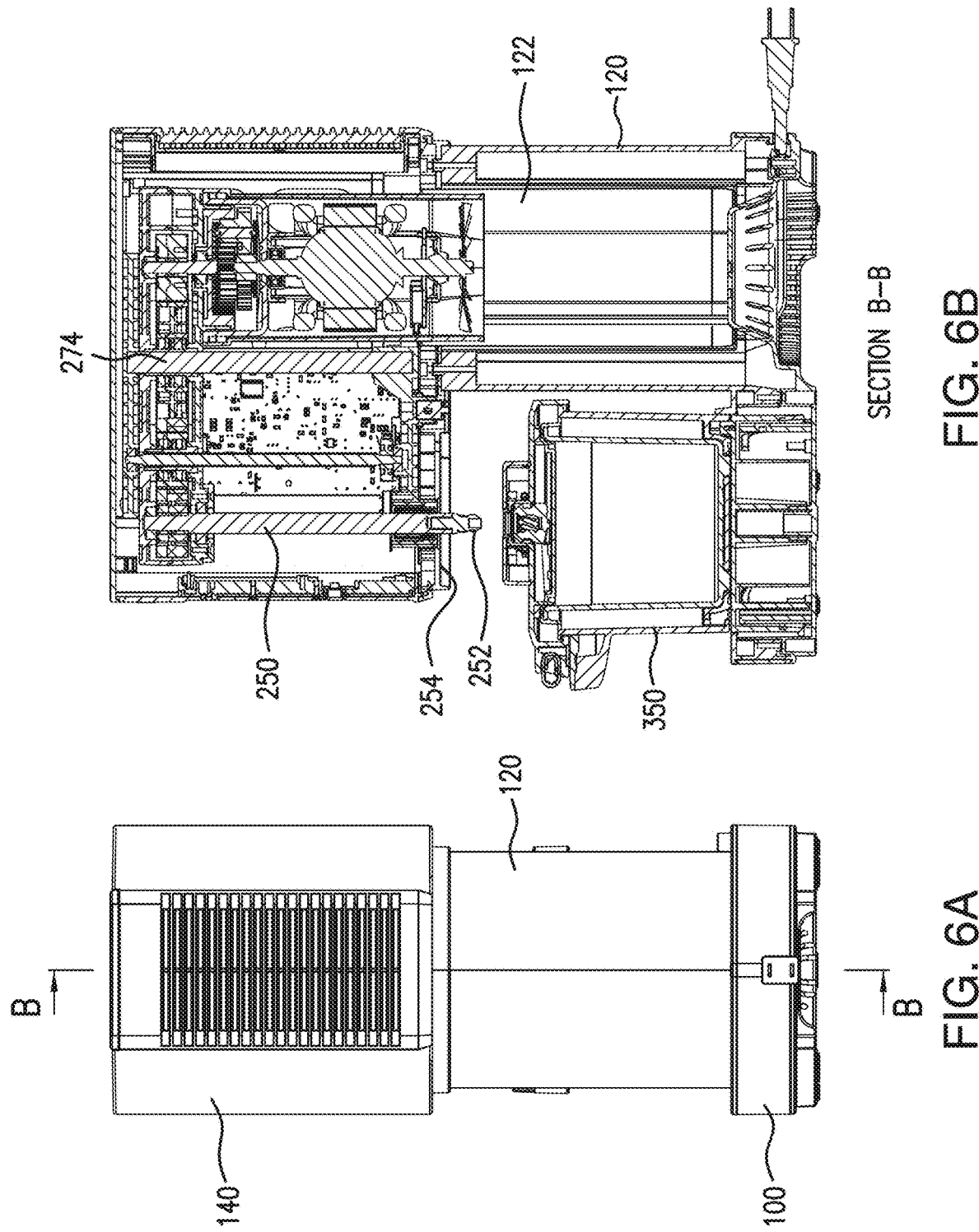

FIG. 8B SECTION C-C

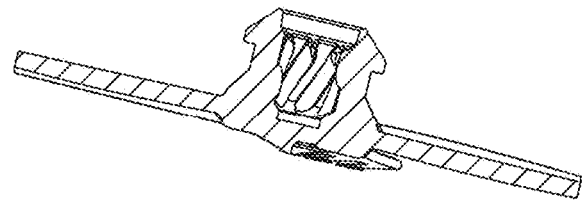
SECTION B-B
FIG. 16B
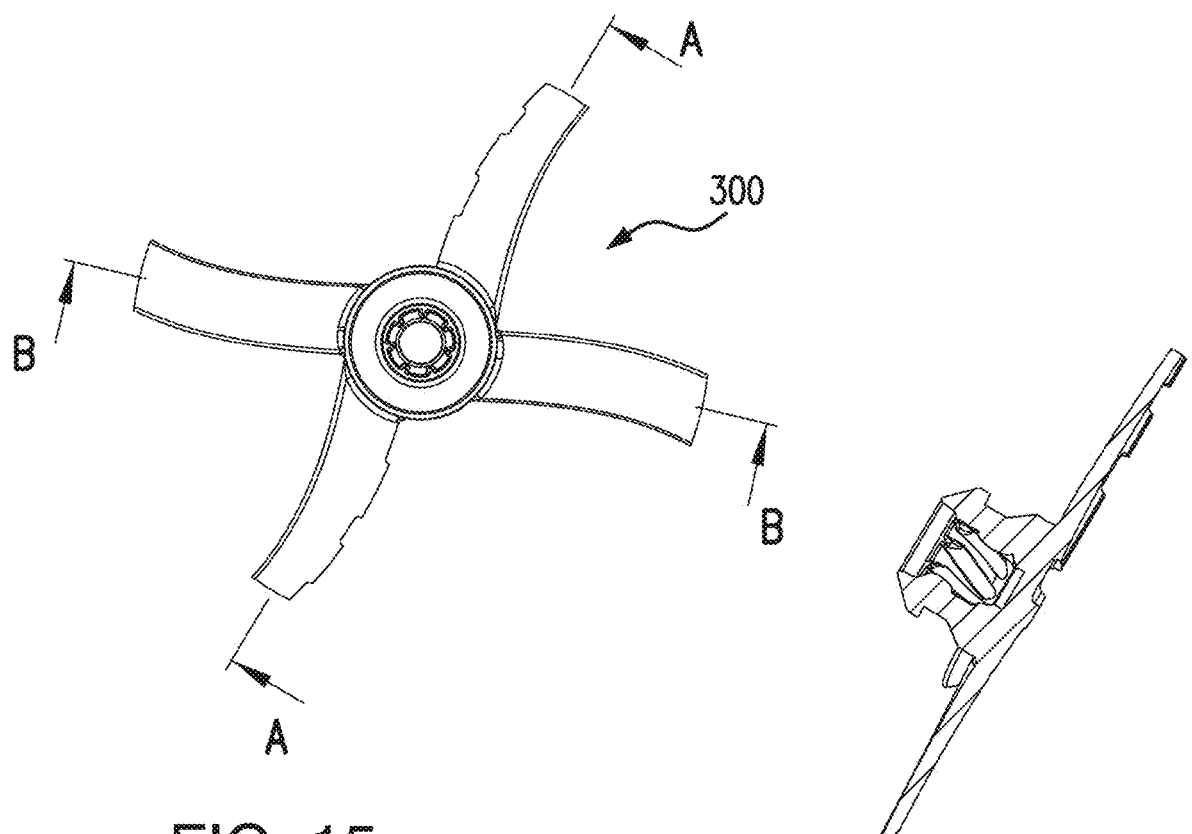
FIG. 15
SECTION A-A
FIG. 16A

SECTION A-A

MICRO PUREE MACHINE

CROSS-REFERENCE TO RELATED APPLICATIONS

This application is a continuation of U.S. application Ser. No. 17/374,435, filed Jul. 13, 2021, entitled MICRO PUREE MACHINE, which in turn is a continuation-in-part of U.S. application Ser. No. 17/139,681, filed Dec. 31, 2020, entitled MICRO PUREE MACHINE, the entire contents of which are incorporated herein by reference in their entirety for all purposes.

FIELD OF THE INVENTION

The present disclosure relates to a kitchen and food processing device, and more particularly, to a device and system for micro pureeing frozen ingredients to make frozen foods and drinks.

BACKGROUND

Home use machines that are intended to make ice creams, gelatos, frozen yogurts, sorbets and the like are known in the art. Typically, a user adds a series of non-frozen ingredients to a bowl. The ingredients are then churned by a paddle while a refrigeration mechanism simultaneously freezes the ingredients. These devices have known shortcomings including, but not limited to, the amount of time and effort required by the user to complete the ice cream making process. Machines of this nature are impractical for preparing most non-dessert food products.

An alternative type of machine known to make a frozen food product is a micro-puree machine. Typically, machines of this nature spin and plunge a blade into a pre-frozen ingredient or combination of ingredients. While able to make frozen desserts like ice creams, gelatos, frozen yogurts, sorbets and the like, micro-puree style machines can also prepare non-dessert types of foods such as non-dessert purees and mousses. In addition, the devices are able to prepare either an entire batch of ingredients to be served or they can prepare a pre-desired number of servings. Known machines of this nature are commercial-grade and are exceedingly large and heavy. They require complex systems that are difficult to maintain and are typically too expensive, cumbersome and/or impractical for home use by consumers.

The present invention solves these and other problems in the prior art.

SUMMARY

An object of the present invention is to provide an improved device for the processing of food and beverage ingredients.

In one exemplary embodiment according the present disclosure, a device for processing food and beverage items is provided including a lower housing, an upper housing and a middle housing, together with an interface for user inputs and a display for providing information to the user. The device further includes a gearbox assembly and a drive motor assembly, as well as a position motor. The position motor enables vertical movement of the gearbox assembly and drive motor assembly. The drive motor assembly provides power to a power shaft and coupling connected to a rotating blade assembly that engages with ingredients for processing.

In some embodiments, the blade assembly includes one or more cutting blades having alternating grooves with distinct dimensions to create a cutting profile that provides for improved power management and processing efficiencies. The blade assembly in some embodiments further includes a central hub for accommodating a power coupling, with improved engagement features for connecting the power coupling and the blade assembly. In some embodiments, the device further includes a lifting platform and cam path tubular insert for providing vertical movement of a bowl assembly and lid assembly by rotational movement of an outer bowl handle.

In another exemplary embodiment according the present disclosure, a blade assembly detection system includes a lid assembly for a bowl assembly. The lid assembly is arranged to receive a blade assembly. The lid assembly is in a first configuration when the blade assembly is connected to the lid assembly and being in a second configuration when the blade assembly is not connected to the lid assembly. The blade assembly also includes a sensor arranged to detect when the lid assembly is in the first configuration. In some embodiments, the lid assembly includes a connector arranged to engage with or disengage from the blade assembly. In some embodiments the lid assembly further includes an actuator arm operatively coupled to the connector and arranged to change a position of the connector to engage with or disengage from the blade assembly. In some embodiments, the actuator arm is in a first position when the connector is engaged with the blade assembly and in a second position when the connector is disengaged from the blade assembly. In some embodiments, the blade assembly detection system further includes a blade position indicator mounted on an end of the actuator arm. In some embodiments, the blade position indicator is made of a magnetic material arranged to emit a magnetic field. In some embodiments, the sensor is configured to detect the magnetic field emitted by the blade position indicator. In some embodiments, the sensor is a hall effect sensor.

In another exemplary embodiment according the present disclosure, a lid assembly for a bowl assembly includes a connector arranged to engage with and disengage from a blade assembly. The connector is configured to be in a first position when the blade assembly is engaged with the connector and in a second position when the blade assembly is disengaged from the connector. The lid assembly also includes a blade position indicator configured to be in a first position when the connector is engaged with the blade assembly and in a second position when the connector is disengaged from the blade assembly.

In some embodiments, the lid assembly further includes an actuator arm operatively coupled to the connector and arranged to move the connector between the first and second positions. In some embodiments, the blade position indicator is mounted on an end of the actuator arm. In some embodiments, the blade position indicator is made of a magnetic material arranged to emit a magnetic field.

In another exemplary embodiment according the present disclosure, a blade assembly detection system for a micro puree machine includes a bowl assembly and a lid assembly configured to be secured to the bowl assembly. The lid assembly includes a connector arranged to engage with and disengage from blade assembly and an actuator arm operably coupled to the connector and arranged to move a position of the connector to engage with or disengage from the blade assembly. The actuator arm being is in a first position when the blade assembly is engaged with the connector and in a second position when the blade assembly is disengaged from the connector. The blade assembly detection system also includes a blade position indicator mounted on a portion of the actuator arm. The blade position indicator is made of a magnetic material arranged to emit a magnetic field. the blade position indicator is in a first position when the actuator arm is in the first position and in a second position when the actuator arm is in the second position. The blade assembly detection system also includes a sensor arranged to detect the magnetic field of the blade position indicator. The sensor is positioned in relation to the lid assembly such that the sensor detects the magnetic field when the blade position indicator is in the first position and does not detect the magnetic field when the blade position indicator is in the second position.

In some embodiments, the sensor is a hall effect sensor. In some embodiments, the sensor is at about a 1 o'clock position relative to a user directly facing an interface of the micro puree machine. In some embodiments, the bowl assembly is configured to be rotated from a down position to an up position by a user. In some embodiments, the blade position indicator is at about a 2:45 o'clock position relative to the user when the bowl assembly is in the down position and the blade position indicator is in the first position. In some embodiments, the blade position indicator is at about a 1 o'clock position relative to the user when the bowl assembly is partially rotated from the down position to the up position and the blade position indicator is in the first position. In some embodiments, the blade position indicator is at about a 12 o'clock position relative to the user when the bowl assembly is in the up position and the blade position indicator is in the first position. In some embodiments, the blade position indicator is at about a 10 o'clock position relative to the user when the bowl assembly is in the up position and the blade position indicator is in the second position.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 5A is a rear view of the device of FIG. 1 with the bowl assembly and lid assembly in an up position;

FIG. 5B is a right side cutaway view of the device of FIG. 5A along section A-A;

FIG. 6A is a rear view of the device of FIG. 1 with the bowl assembly and lid assembly in a down position;

FIG. 6B is a left side cutaway view of the device of FIG. 6A along section B-B;

FIG. 8B is side cutaway view of the assemblies of FIG. 8A along section C-C;

FIG. 15 is a plan view of the central support hub from above;

FIG. 16A is a cutaway view of the central support hub along section A-A of FIG. 15;

FIG. 16B is a cutaway view of the central support hub along section B-B of FIG. 15;

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

Figure 1:
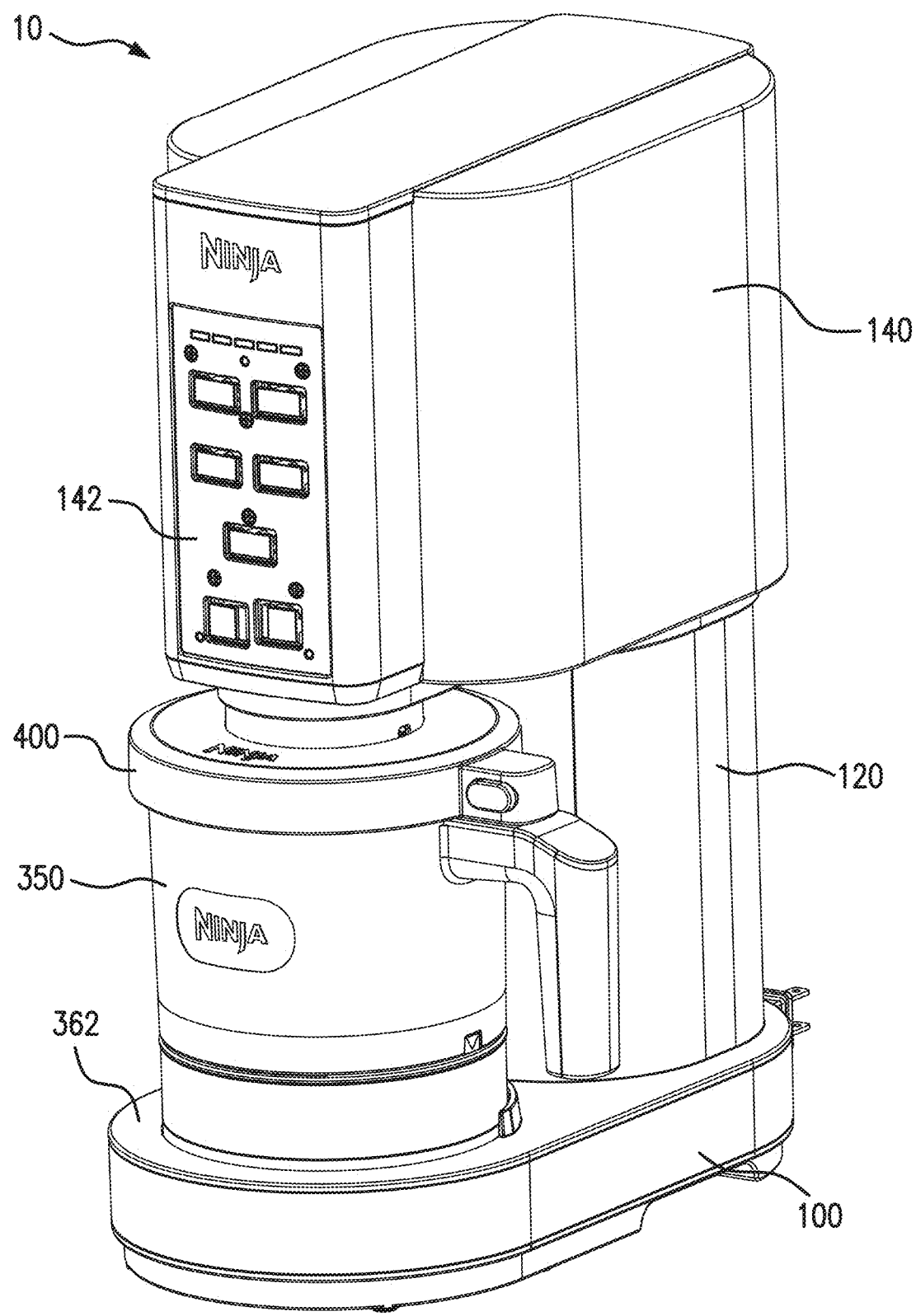
FIG. 1 is an isometric view of a device according to an exemplary embodiment of the present disclosure including a bowl assembly and lid assembly.
Figure 2:
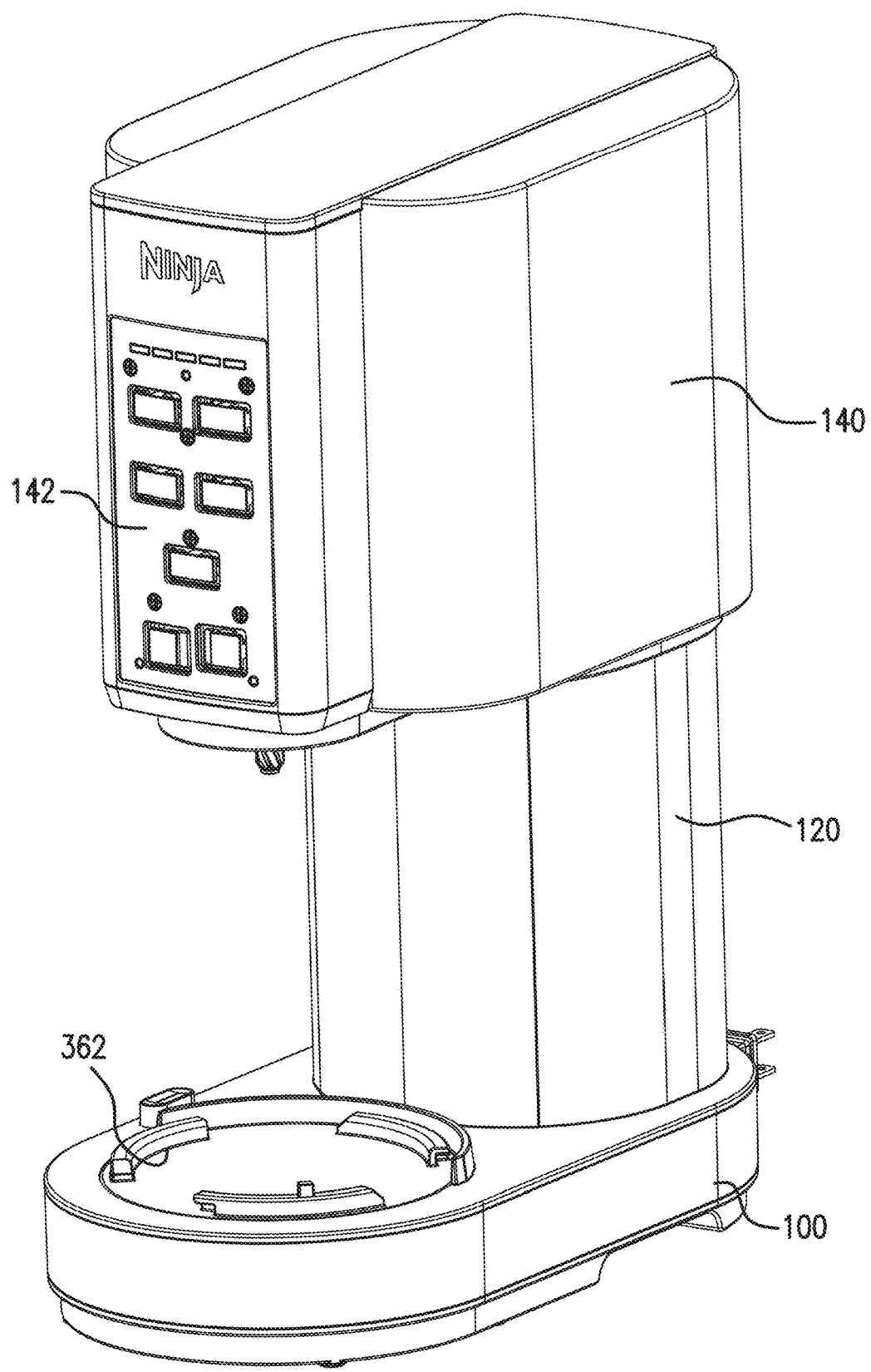
FIG. 2 is another isometric view of the device of FIG. 1 without the bowl assembly and lid assembly.

FIG. 1 shows an isometric view of a device 10 according to an exemplary embodiment of the present disclosure. The device 10 includes a lower housing or base 100 and an upper housing 140. A middle housing 120 extends between the lower housing 100 and upper housing 140. The upper housing 140 includes an interface 142 for receiving user inputs to control the device 10 and/or display information. The device 10 includes a removable bowl assembly 350 and lid assembly 400 on the base 100. FIG. 2 shows the device 10 with the bowl assembly 350 and lid assembly 400 removed.

As further described herein, the bowl assembly 350 receives one or more ingredients for processing. The bowl assembly 350 and lid assembly 400 are placed on the lower housing 100 as show in FIG. 1. The bowl assembly 350 and lid assembly 400 are rotatable on a lifting platform 362 from a down position to an up position, and vice versa.

Figure 3A:
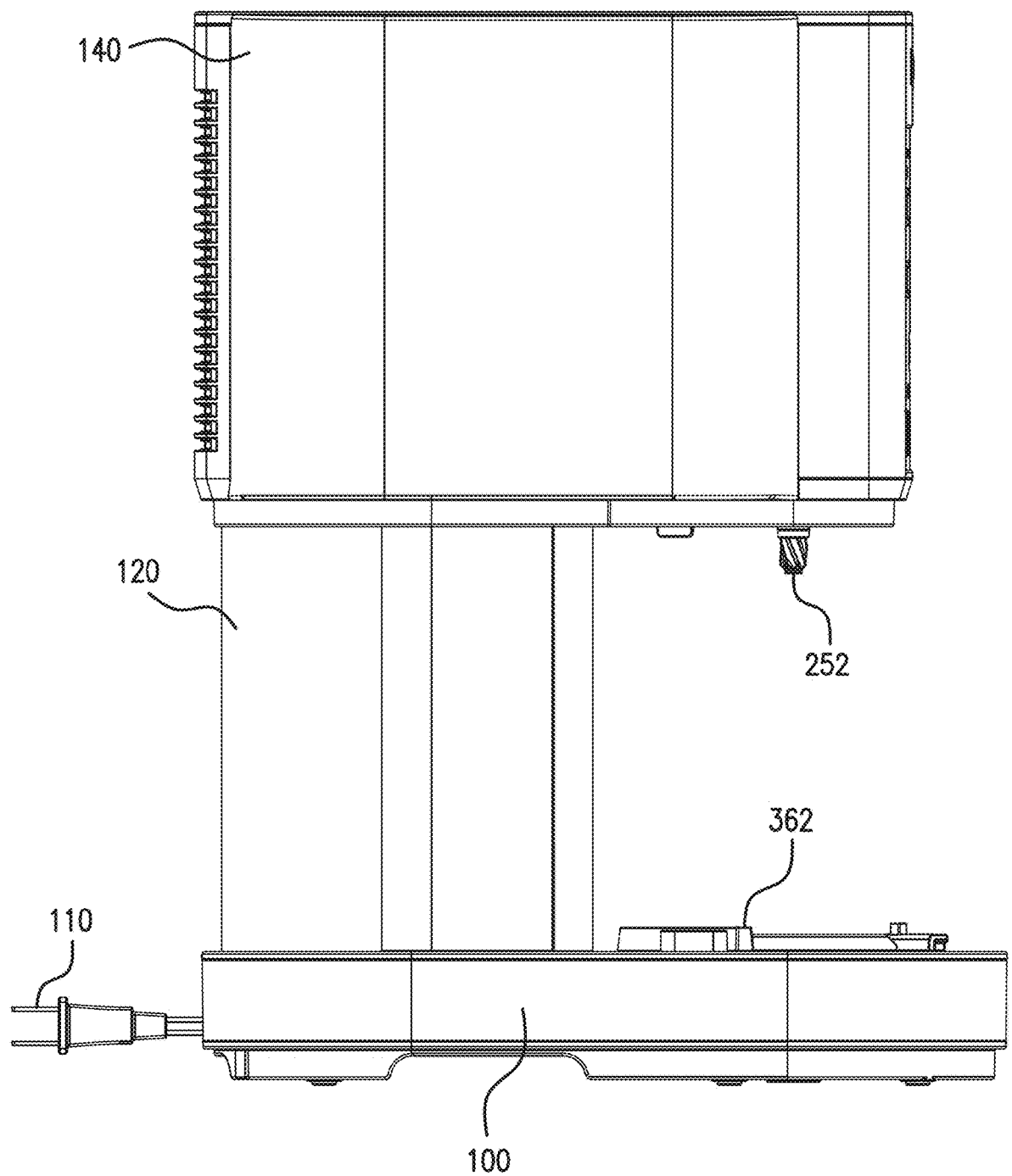
FIG. 3A is a left side view of the device of FIG. 1 without the bowl assembly and lid assembly.
Figure 3B:
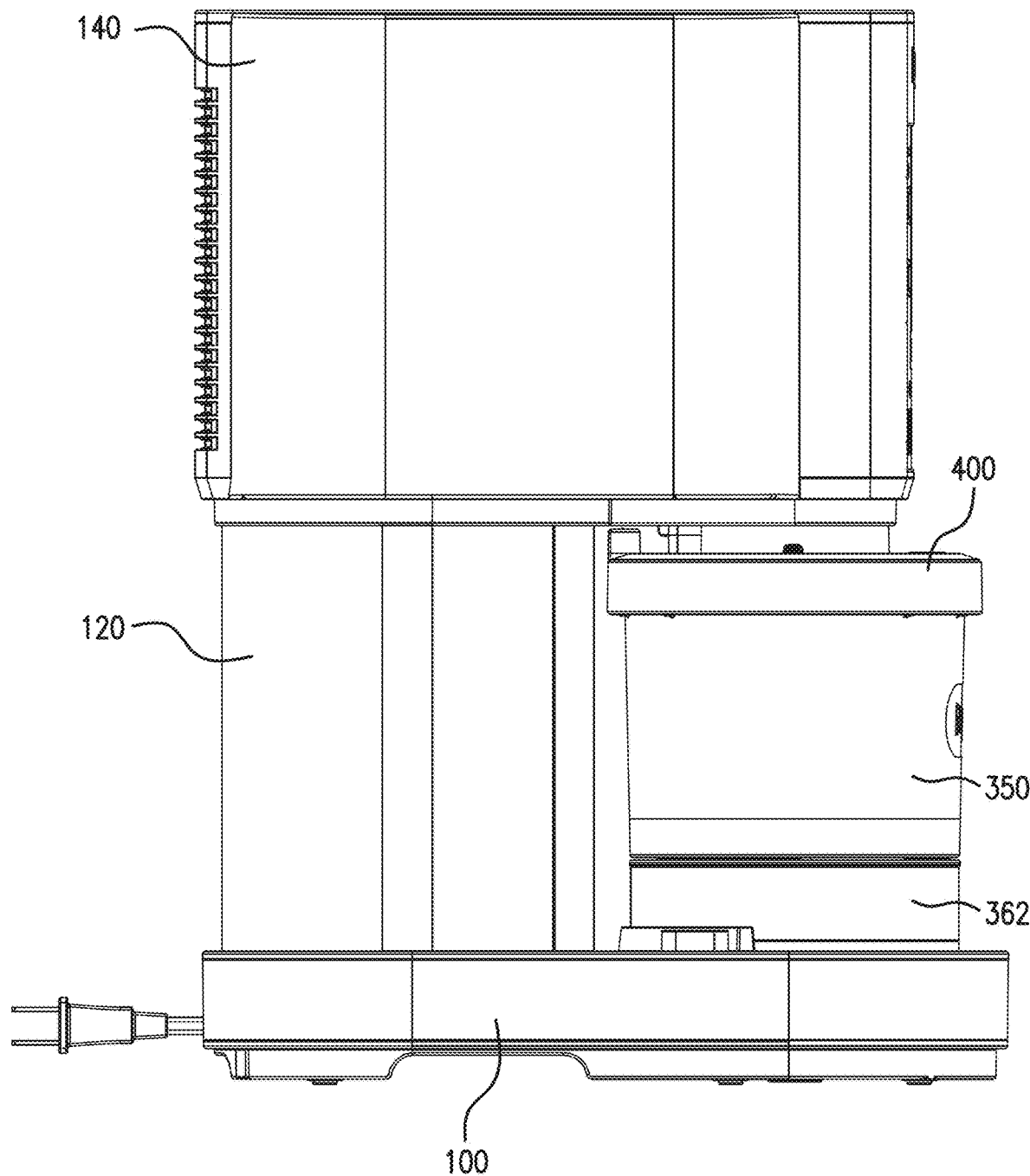
FIG. 3B is a left side view of the device of FIG. 1 with the bowl assembly and lid assembly in an up position.
Figure 3C:
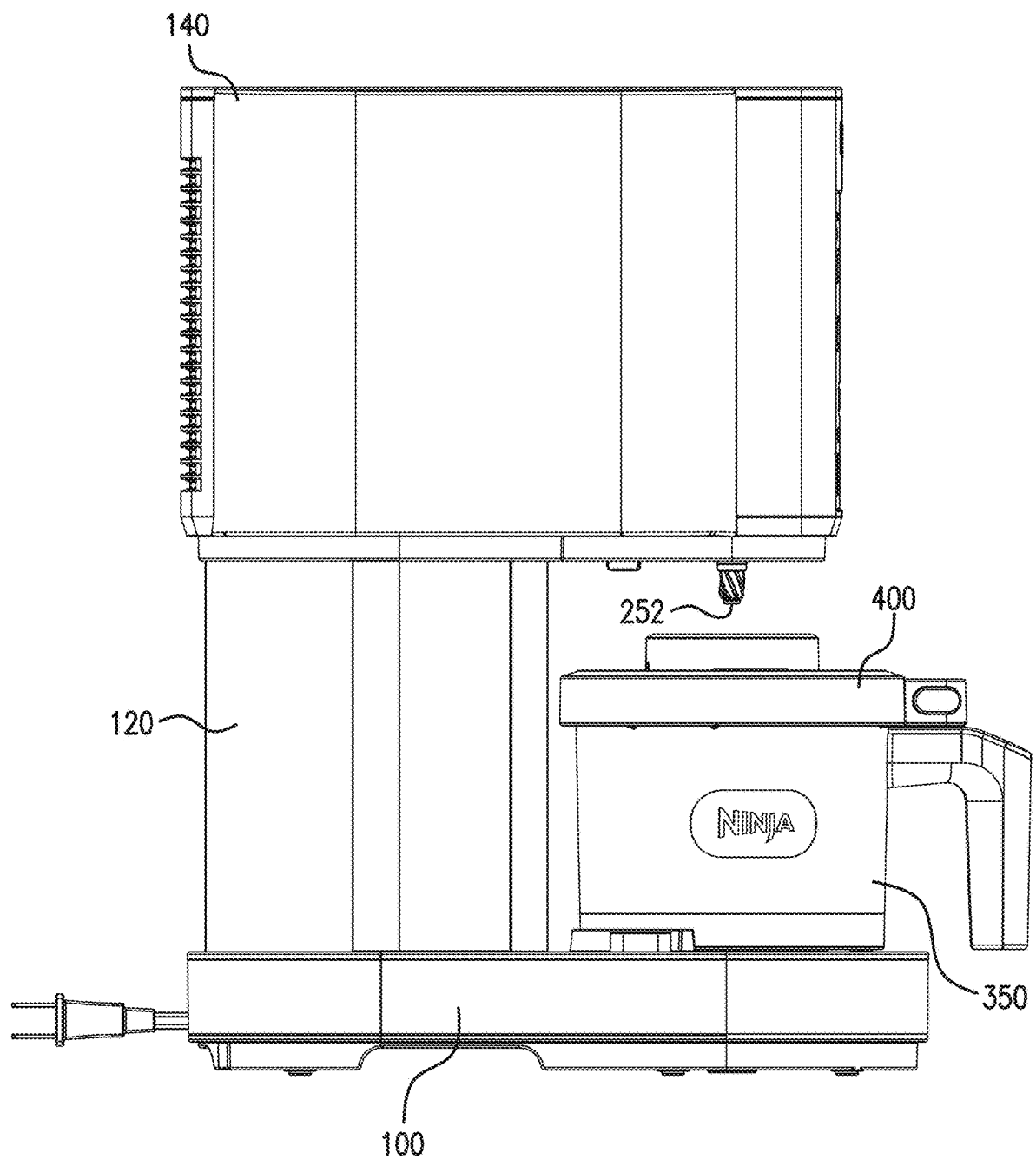
FIG. 3C is a left side view of the device of FIG. 1 with the bowl assembly and lid assembly in a down position.
Figure 4A:
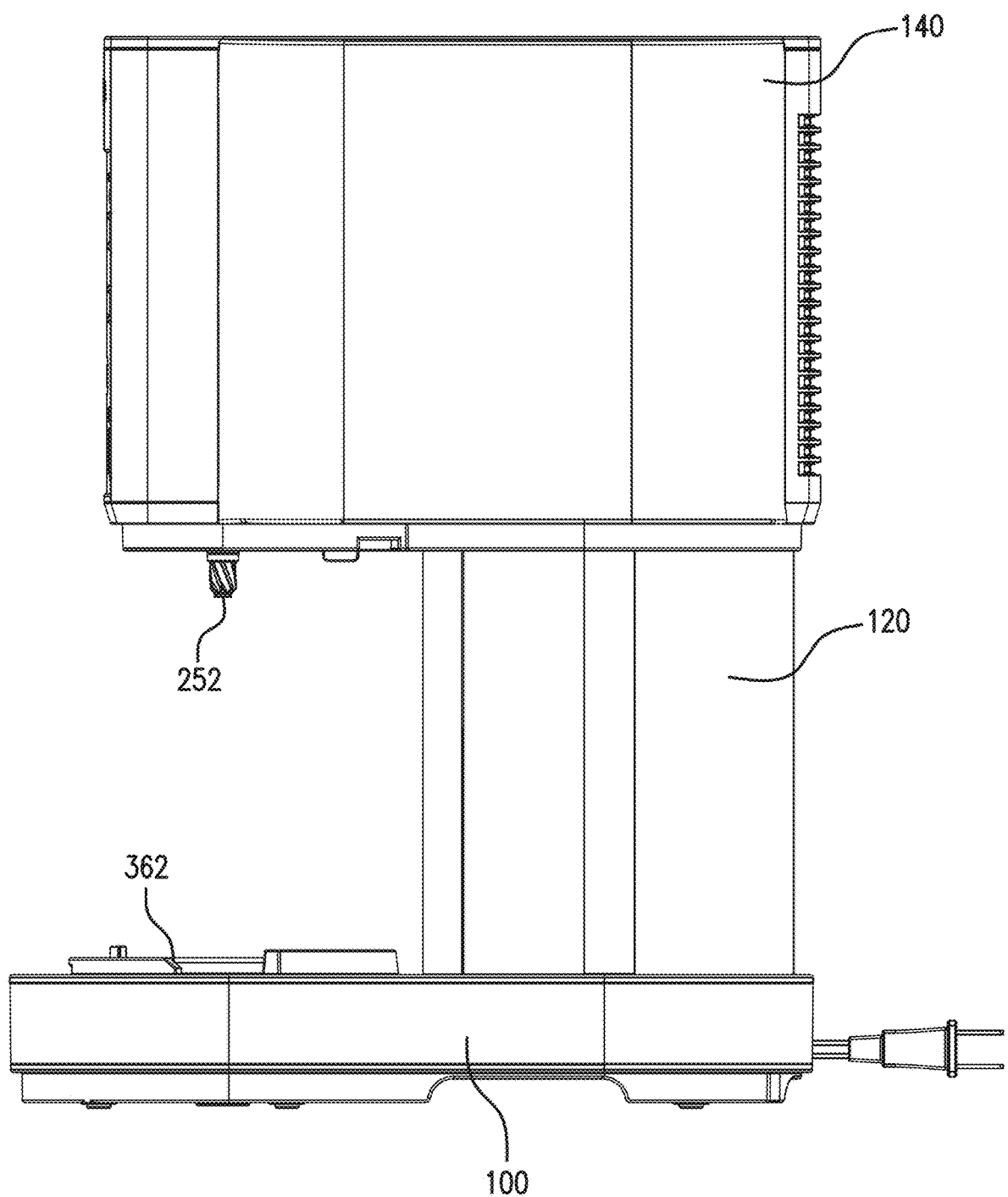
FIG. 4A is a right side view of the device of FIG. 1 without the bowl assembly and lid assembly.
Figure 4B:
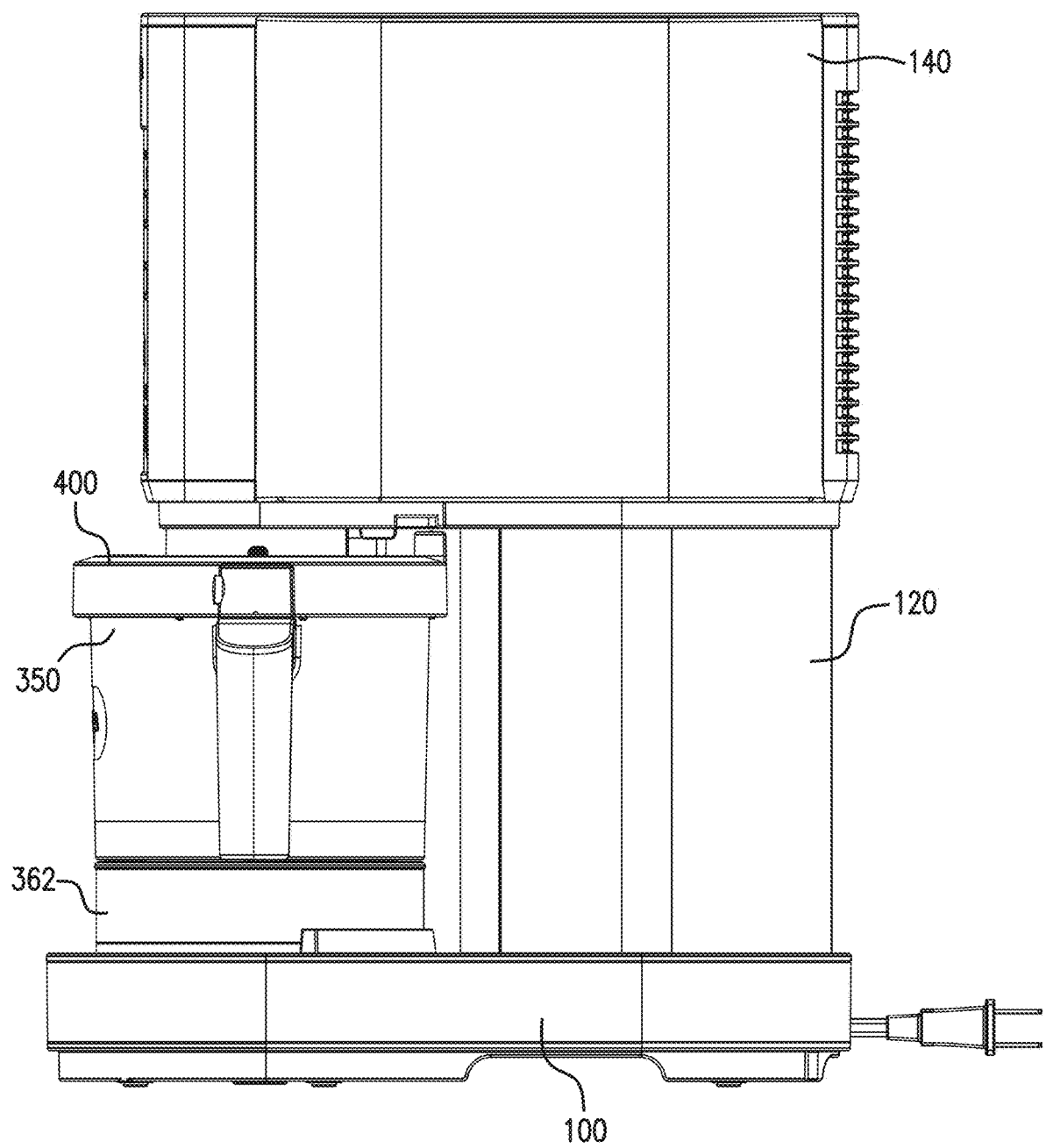
FIG. 4B is a right side view of the device of FIG. 1 with the bowl assembly and lid assembly in an up position.
Figure 4C:
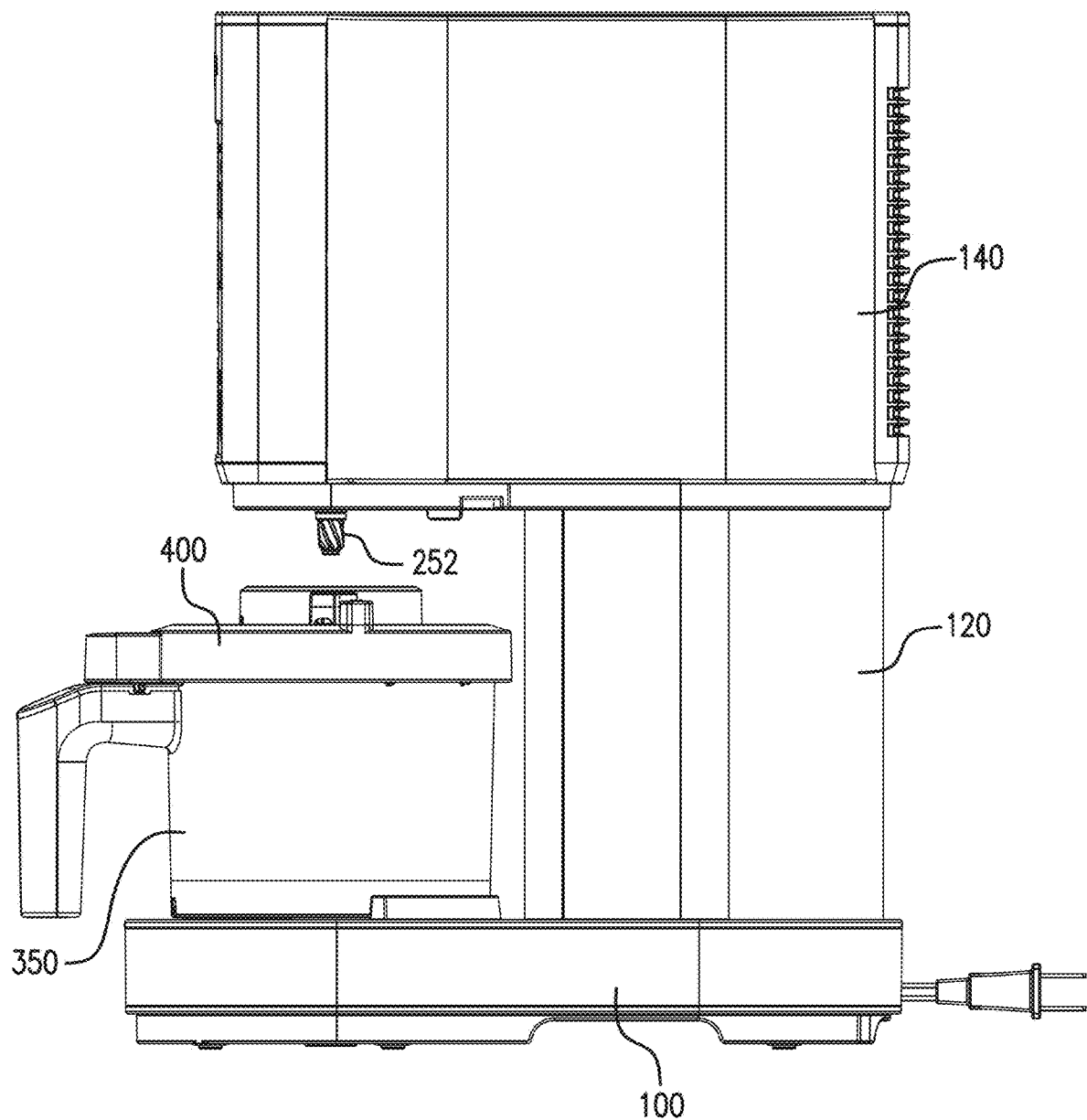
FIG. 4C is a right side view of the device of FIG. 1 with the bowl assembly and lid assembly in a down position.

FIGS. 3A-3C illustrate left side views of the device 10 without a bowl assembly 350 and lid assembly 400, with the bowl assembly 350 and lid assembly 400 in an up position, and with the bowl assembly 350 and lid assembly 400 in a down position, respectively. FIGS. 4A-4C illustrate right side views of the device 10 without a bowl assembly 350 and lid assembly 400, with the bowl assembly 350 and lid assembly 400 in an up position, and with the bowl assembly 350 and lid assembly in a down position, respectively.

As will be discussed in more detail below, when the bowl assembly 350 and lid assembly 400 are raised vertically to the up position, a blade assembly 300 within the lid assembly 400 engages with a power coupling 252 at the distal end of power shaft 250 extending from the upper housing 140. A rotational force is delivered via the power coupling 252 to the blade assembly 300 to spin one or more blades as they engage with ingredients inside the bowl assembly 350.

FIG. 5A is rear view of the device 10, with the bowl assembly 350 in the up position, showing a section line A-A. FIG. 5B is right side cutaway view of the device 10 along section A-A. FIG. 6A is rear view of the device 10, with the bowl assembly 350 in the down position, showing a section line B-B. FIG. 6B is a left side cutaway view of the device 10 along section B-B.

The upper housing 140 includes gearbox assembly 220 and a drive motor assembly 240 connected to the gearbox assembly 220. The drive motor assembly 240 includes a drive motor housing 242 and a drive motor 244. The gearbox assembly 220 includes a gearbox housing 222 containing a plurality of gears for delivering power from the drive motor 244 to a power shaft 250. The power coupling 252 is positioned on a distal end of the power shaft 250.

Figure 7:
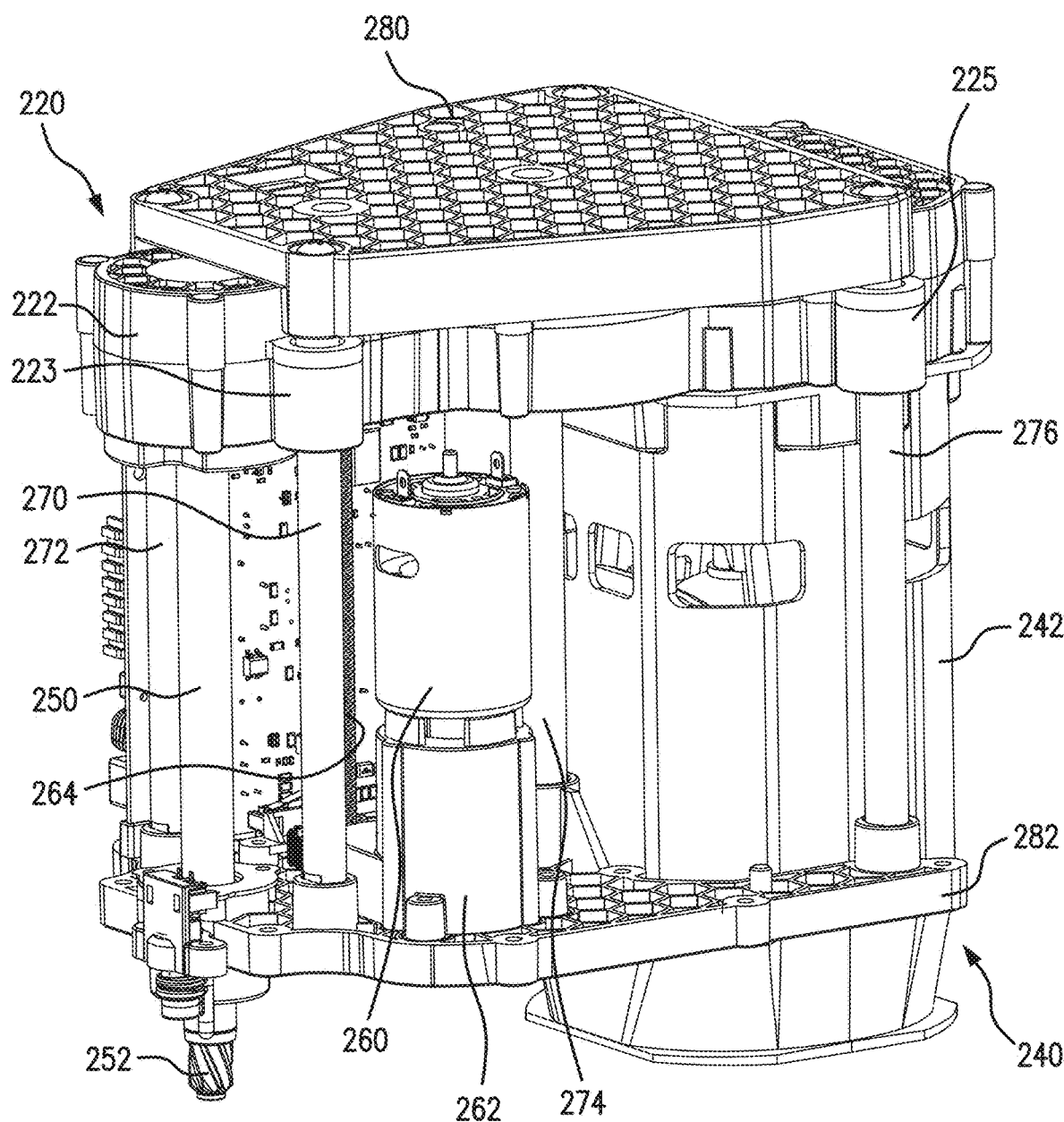
FIG. 7 is an isometric view of internal components of the device of FIG. 1.

FIG. 7 is an isometric view of the gearbox assembly 220 and drive motor assembly 240 of the device 10 with surrounding structure. The device 10 includes an upper support 280 and a lower support 282 positioned in the upper housing 140. The gearbox assembly 220 and drive motor assembly 240 are slidable up and down with respect to the upper and lower supports 280, 282 along a plurality of pillars 270, 272, 274, 276. The pillars and supports provide rigidity and concentric alignment. In the exemplary embodiment, the gearbox assembly 220 and drive motor assembly 240 are supported on the pillars via apertures 223, 225 in the gearbox housing 222. In other embodiments, there may be apertures on the drive motor housing 242 in addition to or instead of on the gearbox housing 222.

The device 10 includes a position motor 260 (e.g., DC motor) which drives a gearbox 262. The gearbox 262 is engaged with a vertical threaded rod or worm gear 264 extending between the upper and lower supports 280, 282. Actuation of the position motor 260, either manually via the interface 142 or automatically, moves the gearbox assembly 220 and drive motor assembly 240 up and down. The rod pitch of the worm gear 264 relate to a vertical decent rate of the device 10. The drive motor assembly 240 moves down into a cavity 122 in the middle housing 120 (see FIGS. 5B and 6B).

The power shaft 250 and power coupling 252 move together with the gearbox assembly 220 and drive motor assembly 240. Thus, actuation of the position motor 260 in turn allows for vertical movement and positioning of a blade assembly 300 removably attached to the power coupling 252. In the exemplary embodiment, the up and down travel distance is between 70 and 120 mm, or between 90 and 100 mm, such as about 94 mm.

The power coupling 252, and therefore the blade assembly 300, may be controlled at different rotational speeds (e.g., via the drive motor 244) and moved up and down (e.g., via the position motor 260) in different patterns and speeds to make different food items such as frozen purees and desserts. Exemplary programs are illustrated below in Table 1.

244 is rotatably connected to a transmission 230. The transmission 230 is connected to a first gear 232. The first gear 232 drives a gear 238, either directly or through one or a plurality of intermediate gears 234, 236, which then drives the power shaft 250.

Figure 10:
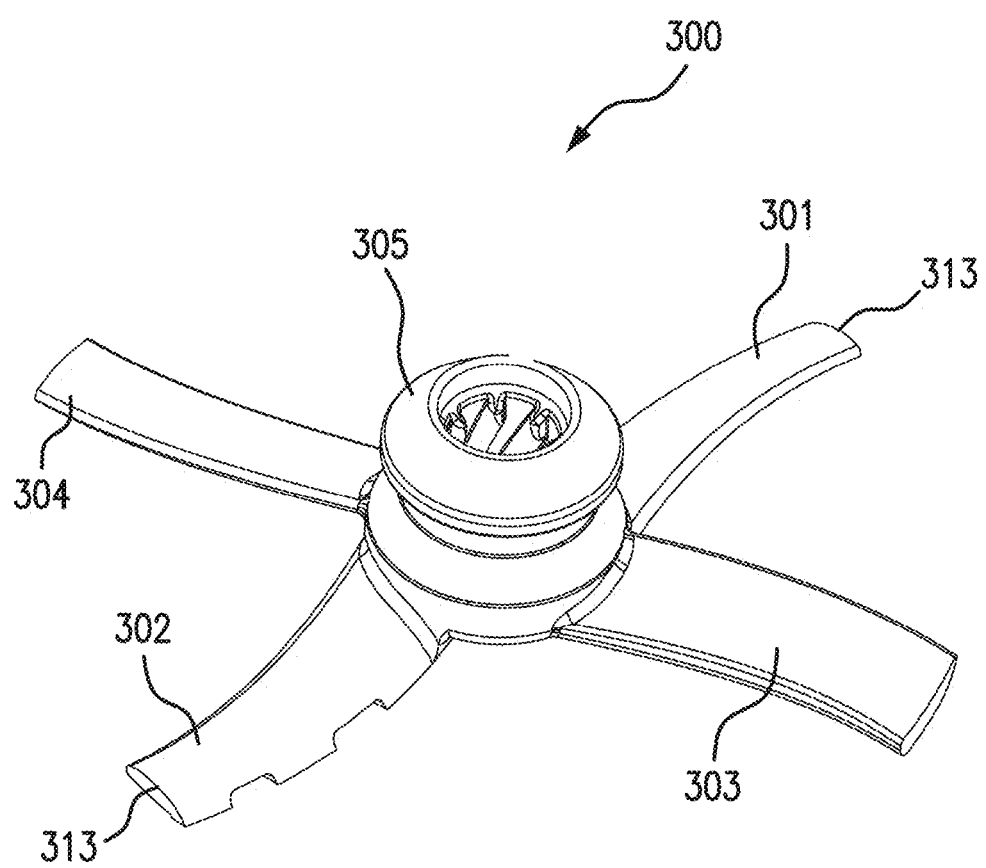
FIG. 10 is an isometric view of the blade assembly of the device of FIG. 1.
Figure 11:
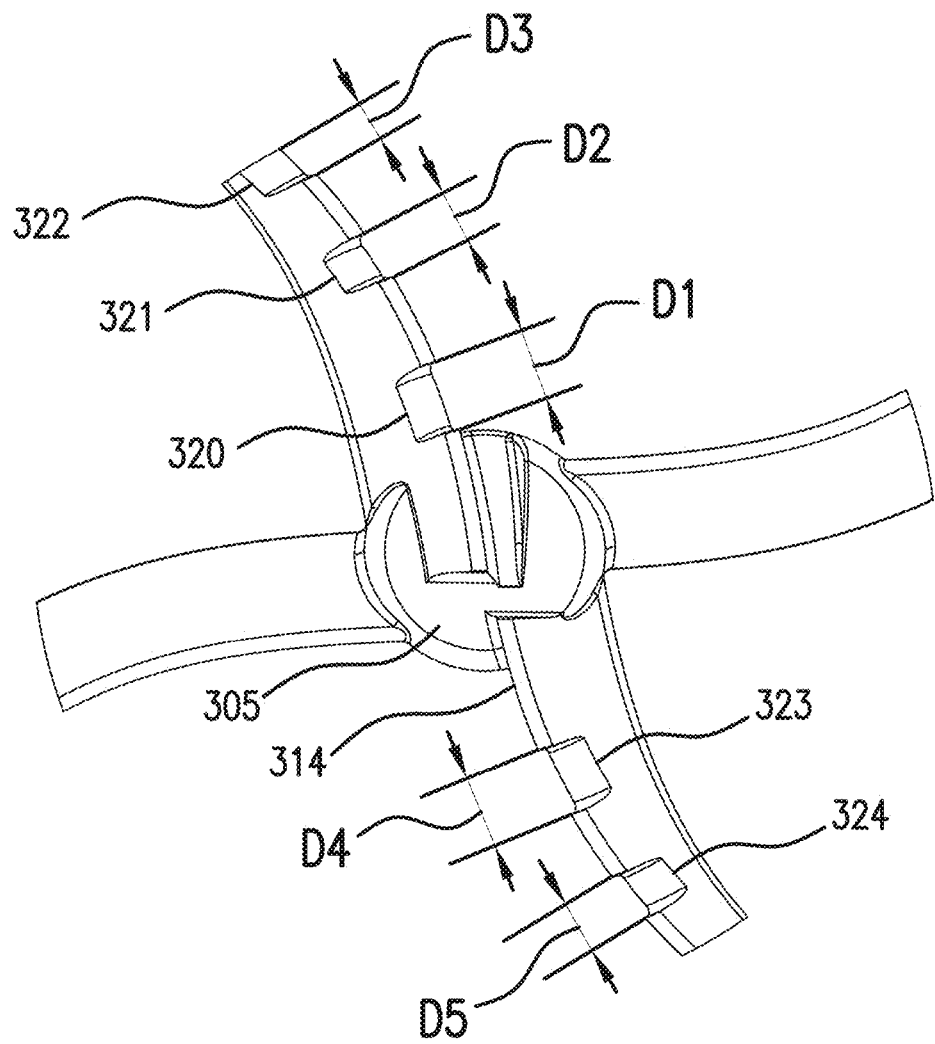
FIG. 11 is a plan view of the underside of the blade assembly of FIG. 10.
Figure 12:
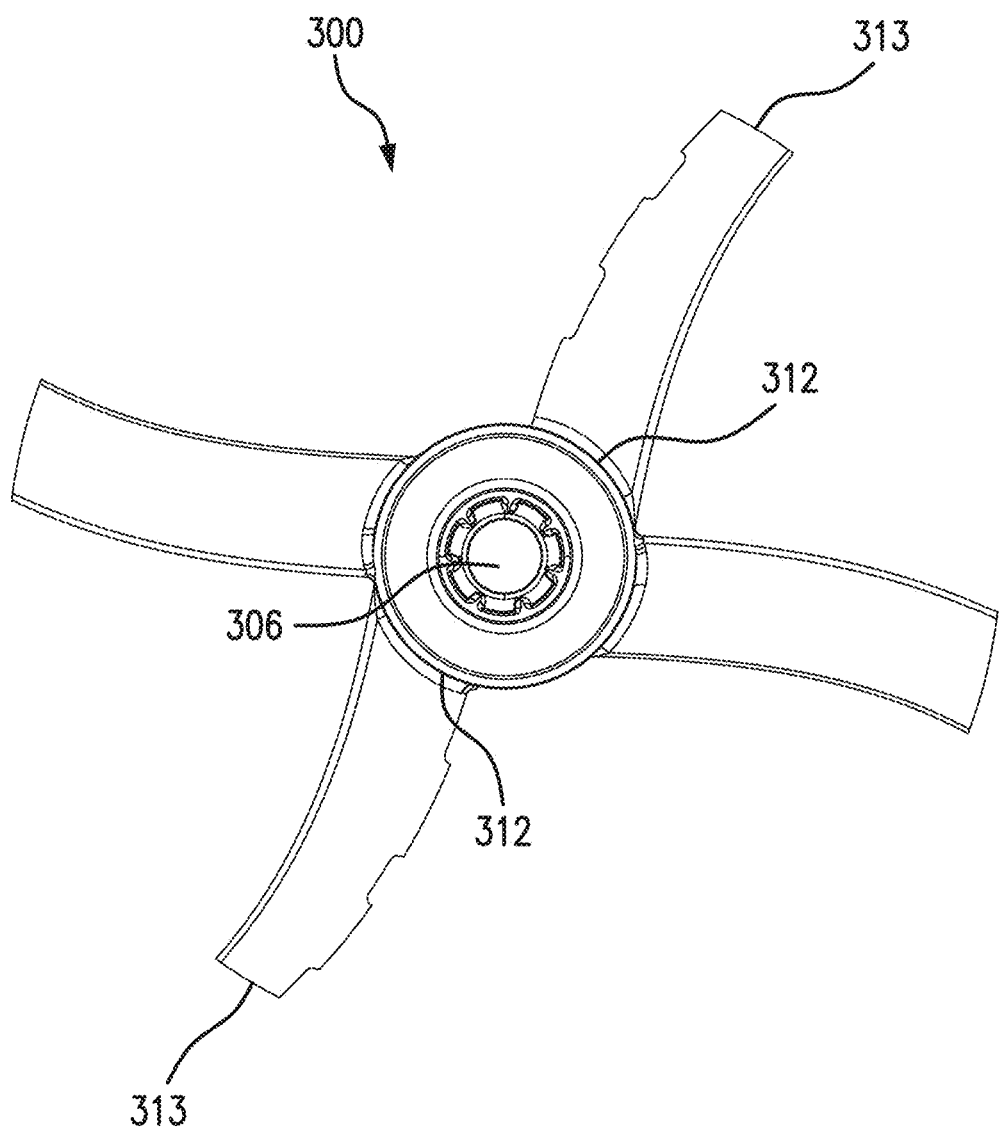
FIG. 12 is a plan view of the top of the blade assembly of FIG. 10.

The device 10 comprises a moving blade assembly 300 for processing food and beverage items. FIG. 10 is an isometric view of the moving blade assembly 300. FIG. 11 is a plan view of the underside of the moving blade assembly 300. FIG. 12 is a plan view of the top of the moving blade assembly 300. The moving blade assembly 300 comprises one or more cutting blades 301, 302 and one or more mixing blades 303, 304. The moving blade assembly 300 further comprises a central support hub 305. The cutting blades 301, 302 and the mixing blades 303, 304 extend outward from central support hub 305. The central support hub 305 provides a central opening 306 for accepting the power coupling 252.

With reference to FIG. 10, FIG. 11 and FIG. 12, cutting blades 301 and 302 of said moving blade assembly 300 comprise a horizontally extending length having a proximal end 312 and a distal end 313. The proximal end 312 meets the central support hub 305. The cutting blades 301, 302 comprise a leading edge 314 and a follower edge 315. Likewise, mixing blades 303, 304 extend from the central support hub 305 and are generally positioned in an opposing orientation.

Figure 13A:
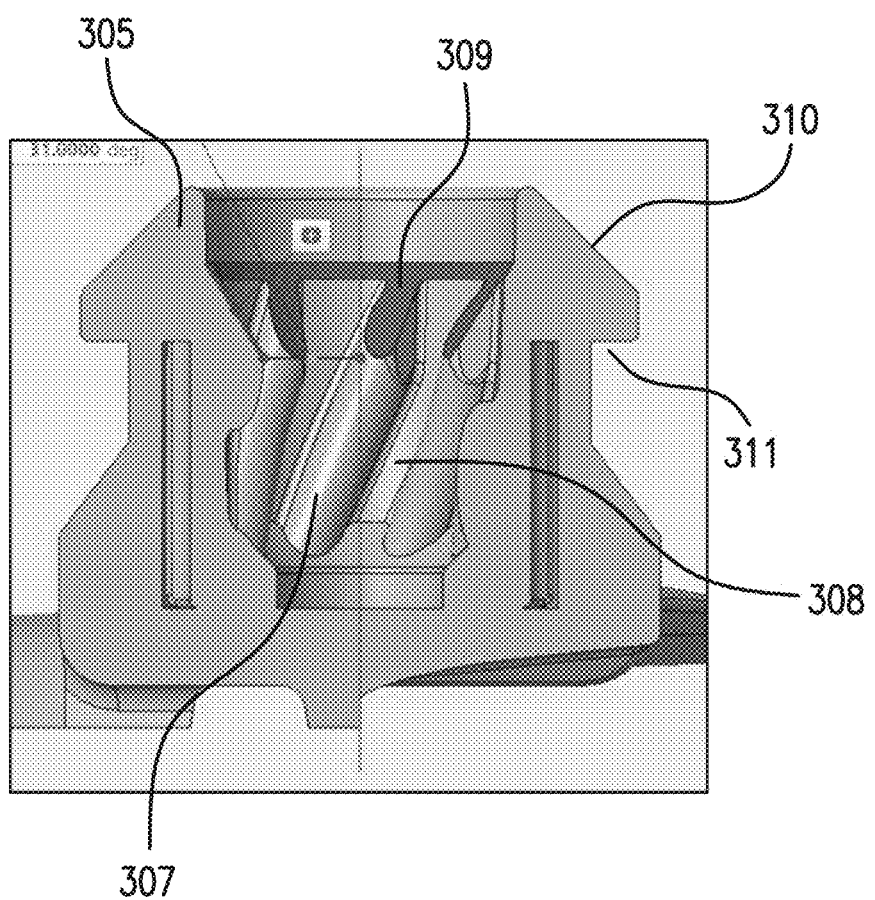
FIG. 13A is a section view through the center of the central support hub.
Figure 13B:
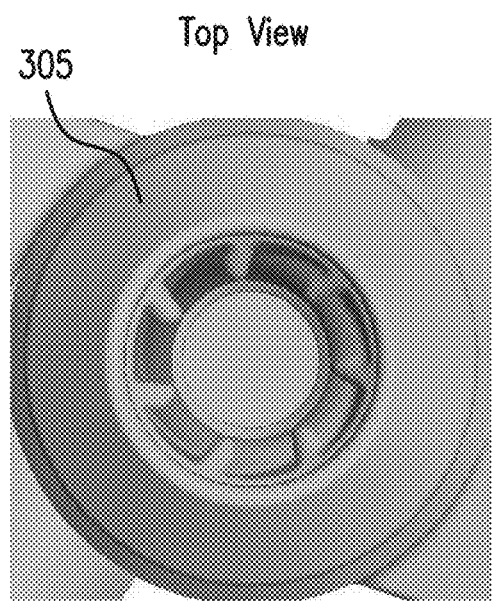
FIG. 13B is a plan view of the top of the central support hub.

FIG. 13A and FIG. 13B show the engagement features of the central support hub 305. The central support hub 305 comprises a plurality of male helical couplings 307 positioned along the interior sides of the central opening 306 and extending into the central opening 306. Between said male helical couplings 307 are vacancies 308. In an exemplary embodiment, the male helical couplings 307 comprise an

TABLE 1

| Program | Decent Blade Speed (rpm) | Decent Time (s) | Retraction Blade Speed (rpm) | Retraction Time (s) | Decent RPM/mm | Retract RPM/mm | Total Program RPM/mm |
|---|---|---|---|---|---|---|---|
| Ice Cream | 1200 | 60 | 450 | 30 | 13 | 2 | 15 |
| Sorbet | 1600 | 120 | 450 | 30 | 34 | 2 | 36 |
| Gelato | 1200 | 60 | 450 | 30 | 13 | 2 | 15 |
| Milkshake | 1600 | 60 | 450 | 30 | 17 | 2 | 19 |
| Smoothie Bowl | 1600 | 120 | 1600 | 30 | 34 | 9 | 43 |
| Frozen Drink | 1600 | 120 | 450 | 30 | 34 | 2 | 36 |
| Slush | 1600 | 120 | 1600 | 30 | 34 | 9 | 43 |
| Whip/Re-Spin | 1000 | 30 | 1000 | 30 | 5 | 5 | 11 |
| Mix-In | 450 | 30 | 450 | 30 | 2 | 2 | 5 |

Figure 8A:
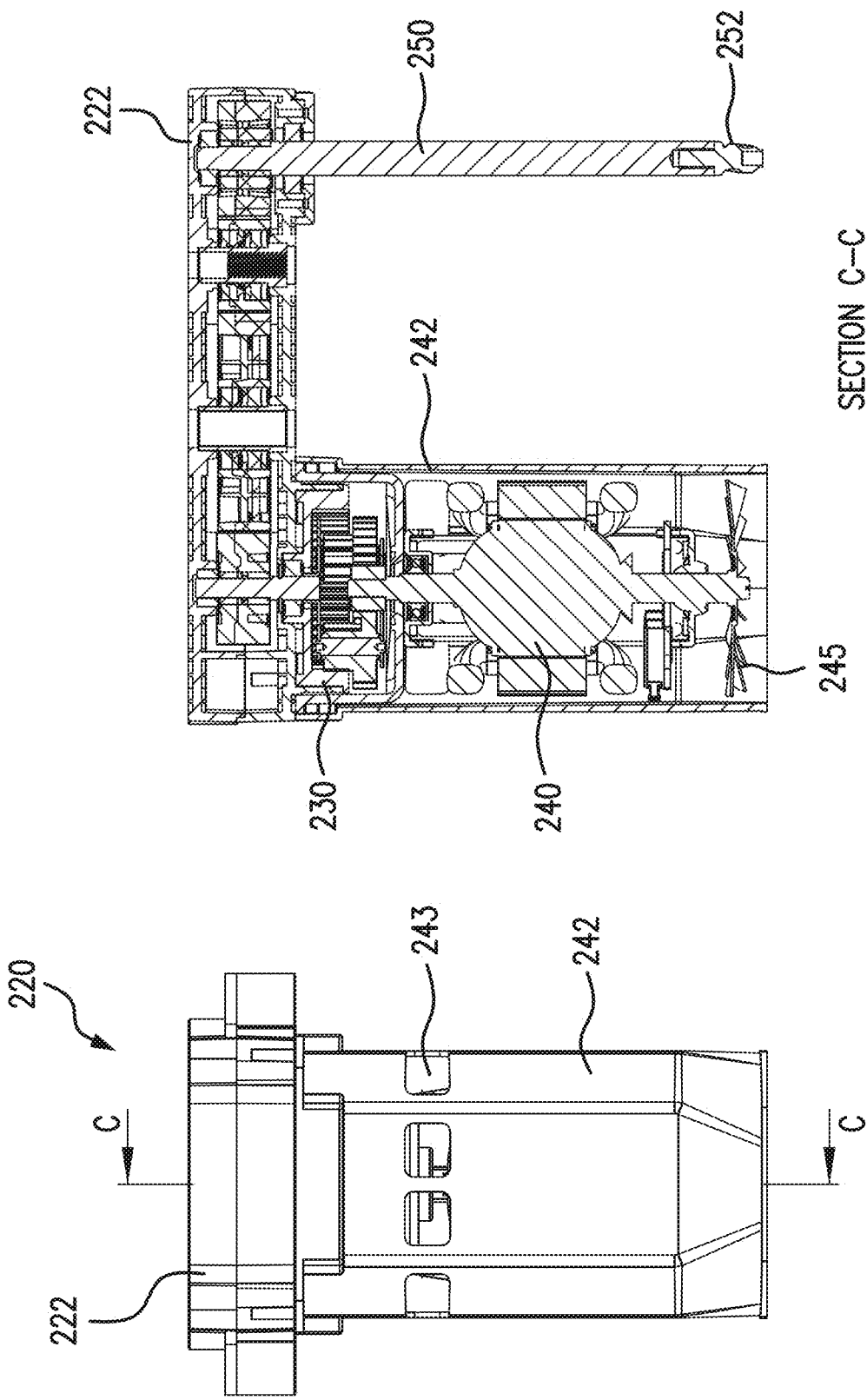
FIG. 8A is front view of gearbox and drive motor assemblies of the device of FIG. 1.

FIG. 8A is front view of the gearbox assembly 220 and drive motor assembly 240 of the device 10 of FIG. 1. FIG. 8B is side cutaway view of the assemblies of FIG. 8A along a section C-C. As discussed above, the gear assembly 220 includes a housing 222. In the exemplary embodiment, the housing 222 includes upper and lower portions removably attached together. A housing 242 of the drive motor assembly 240 is removably attached to the lower portion of the housing 222. In other embodiments, the housing 242 is formed together with the housing 222 or at least together with the lower portion of the housing 222. In the exemplary embodiment, the housing 242 includes a plurality of openings 243 for ventilation and cooling of the drive motor 244. The device 10 may further include a fan 245 on the motor 244.

Figure 9:
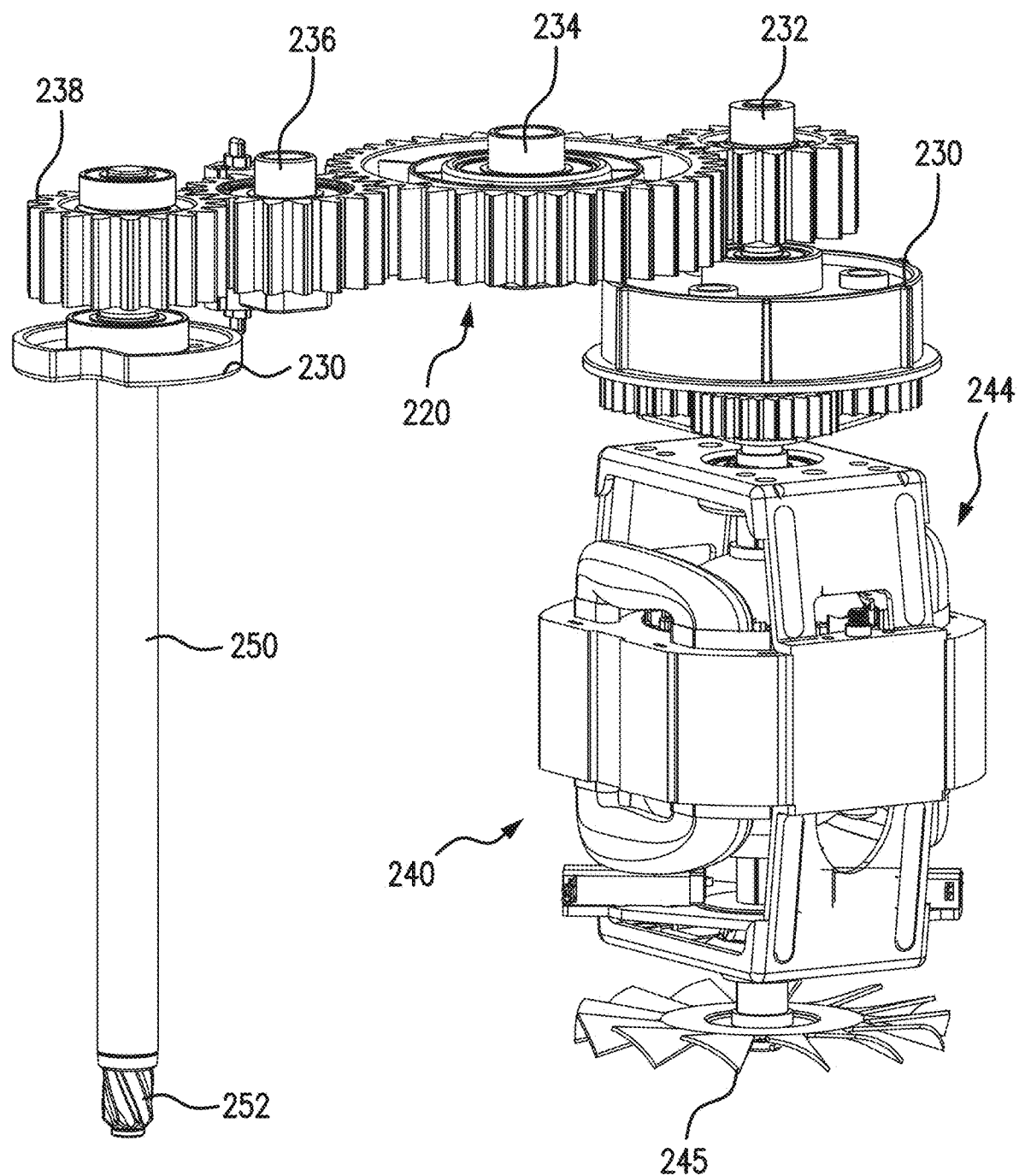
FIG. 9 is an isometric view of the gearbox and drive motor assemblies of the device with housings removed.
Figure 14A:
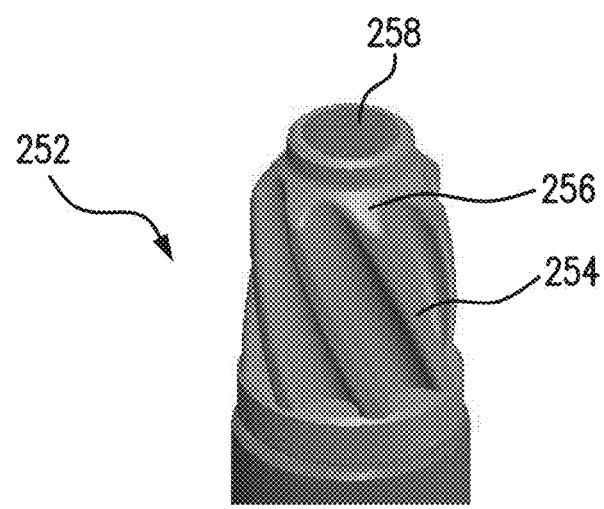
FIG. 14A is an isometric view of the power coupling of the device of FIG. 1.
Figure 14B:
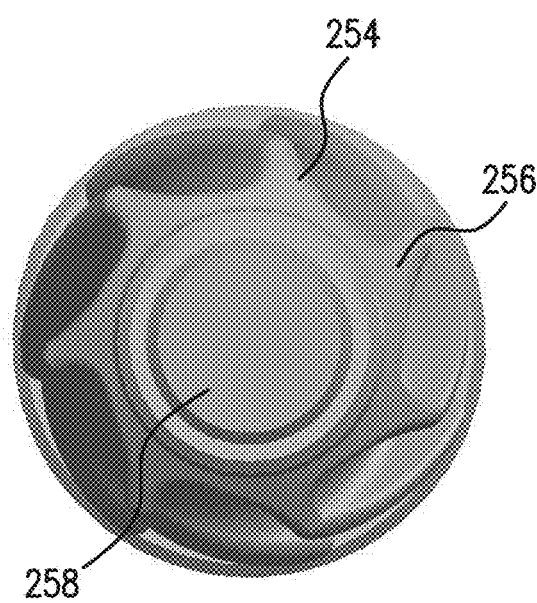
FIG. 14B is a plan view of the bottom of the power coupling of FIG. 14A.

FIG. 9 is an isometric view of the gearbox assembly 220 and drive motor assembly 240 with the housings 222, 242 removed. In the exemplary embodiment, the drive motor angled lead in 309. FIGS. 14A and 14B show the corresponding engagement features of the power coupling 252. The power coupling 252 has a plurality of external male helical coupling components 254 with an angled lead-in 256. Said male helical coupling components 254 engage with corresponding vacancies 308 within the central support hub 305. In some embodiments, the power coupling 252 includes a magnet 258 at a distal end to aid in positioning and removably securing the blade assembly 300 and the power coupling 252.

FIGS. 13A, and 28-30 show engagement features of the blade assembly 300 for engagement with the lid assembly 400. The central support hub 305 comprises an angled external ledge 310 and undercut 311. As will be discussed more fully below, the lid assembly 400 comprises a primary sets of clips 408 that are spring-biased toward the center of the lid assembly 400. As the central support hub 305 travels upward into the lid assembly 400, the clips engage the undercut 311. The lid assembly 400 and the blade assembly 300 are held together prior to the blade assembly 300 engaging the power coupling 252.

It will be appreciated that the moving blade assembly 300 can be a unitary structure or can comprise distinct structures joined together either directly or indirectly. The moving blade assembly 300 in one embodiment is cast stainless steel with a PVD titanium coating.

In an exemplary embodiment as shown in FIGS. 15, 16A and 16B, cutting blades 301, 302 and mixing blades 303, 304 are curved, with said curvature extending along all or at least a portion of the length of the blades in a concave configuration in relation to the direction of blade rotation during use.

Figure 17:
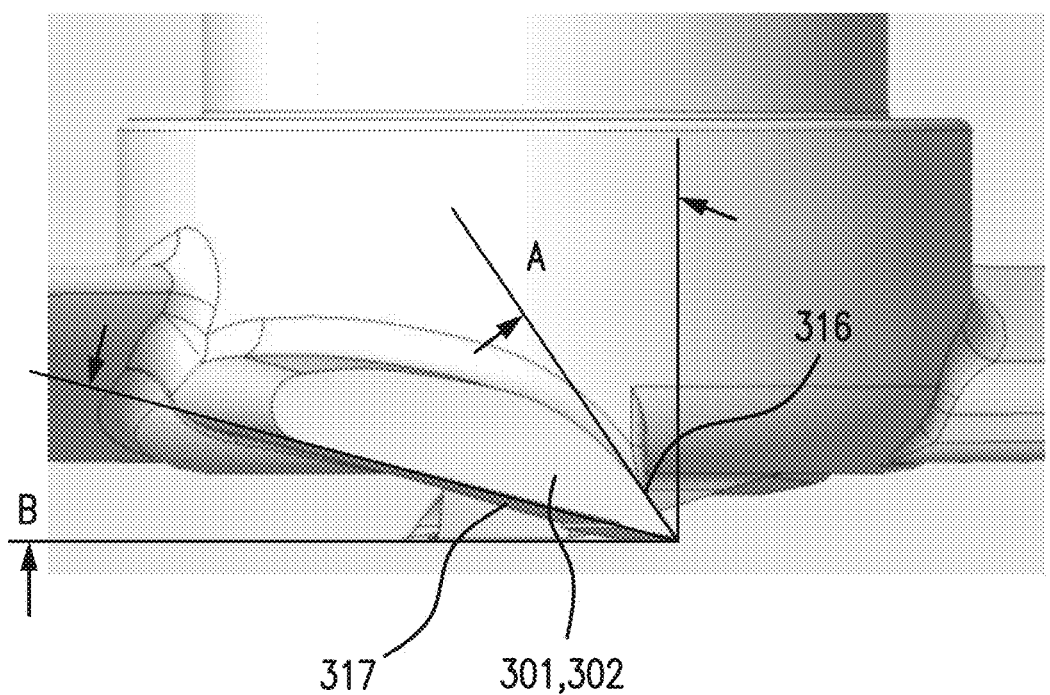
FIG. 17 is a section view through a cutting blade of the device of FIG. 1.

As shown in FIG. 17, the said cutting blades 301, 302 further comprise a rake angle labeled "A" and a clearance angle labeled "B". The plane of rotation defines a horizontal reference plane and the axis of rotation is orthogonal to said plane of rotation. Said rake angle A is that angle extending between the rake surface 316 and the vertical axis of rotation. The clearance angle B is the angle extending between the reference plane and the underside 317 of the blade.

Referring again to FIG. 11, the first cutting blade 301 further comprises one or more grooves 320, 321, 322 to aid in cutting efficiency and power management. The grooves 320, 321, 322 are positioned along the leading edge 314 and extend into the body of the cutting blade 301. The second cutting blade 302 also comprises one or more grooves 323, 324, again to aid in cutting efficiency and power management. The grooves 323, 324 are positioned along the leading edge 314 and extend into the body of the blade 302.

Figure 18:
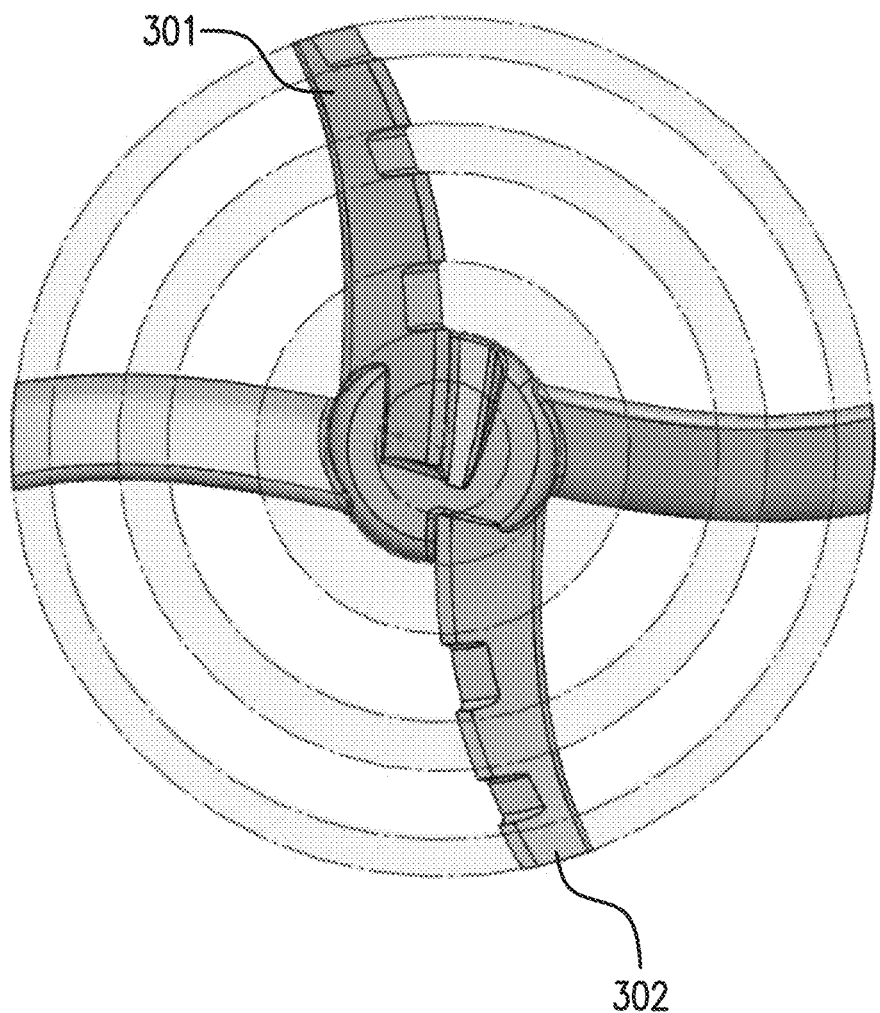
FIG. 18 is a cutting profile of the blade assembly of FIG. 10.

In an exemplary embodiment, with respect to the first cutting blade 301, the dimension D1 of a first groove 320 is greater than the dimension D2 of a second groove 321. Likewise, the dimension D2 of the second groove 321 is greater than the dimension D3 of the third groove 322. Similarly, with respect to the second cutting blade 302, the dimension D4 of the fourth groove 323 is greater than the dimension D5 of the fifth groove 324. Referring to FIG. 18, the said grooves 320, 321, 322, 323, 324 are positioned along the leading edges 314 of the cutting blades 301, 302 so as to create alternate cutting profile rings. The largest groove on the first cutting blade 301, the first groove 320, is positioned closest to the proximal end 312 while the smallest groove on the first cutting blade 301, the third groove 322, is positioned closest to the opposing end of the first cutting blade 301. Similarly, the largest groove on the second cutting blade 302, the fourth groove 323, is positioned closer to the proximal end 312 while the smallest groove on the second cutting blade 302, the fifth groove 324, is positioned closer to the opposing end of the second cutting blade 302. This arrangement of alternating grooves on opposing cutting blades 301, 302 creates a favorable cutting profile.

Figure 19:
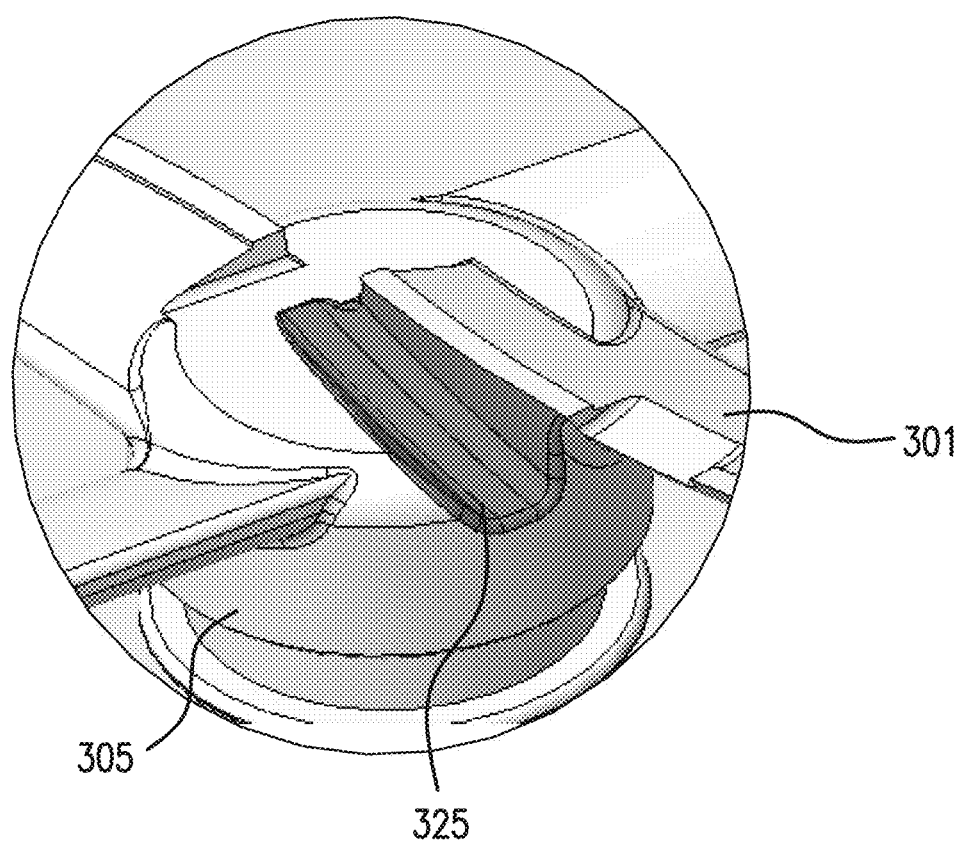
FIG. 19 is an isometric view of a V-shaped groove on the underside of the central support hub.

In a further aspect of the blade assembly 300, the central support hub 305 comprises at least one V-shaped groove 325 on the underside of the central support hub 305 as can be seen in FIG. 19. One edge of the V-shaped groove 325 extends along a portion of the side of the first cutting blade 301. In an alternate embodiment (not shown), a second V-shaped groove 325 could be provided along a portion of the side of the second cutting blade 302. The V-shaped groove 325 aids in directing the material to be processed away from the central support hub 305 and into the path of the cutting blades 301, 302 and the mixing blades 303, 304.

The device 10 further includes a bowl assembly 350 that joins with a lid assembly 400. The bowl assembly 350 comprises a beaker 351 and an outer bowl 352. The beaker 351 fits inside the outer bowl 352. The beaker 351 holds the food materials to be processed by the device 10 during use. In some embodiments, the beaker 351 of the bowl assembly 350 is disposable, and can be prefilled with desired ingredients and sold as a standalone item.

Figure 20:
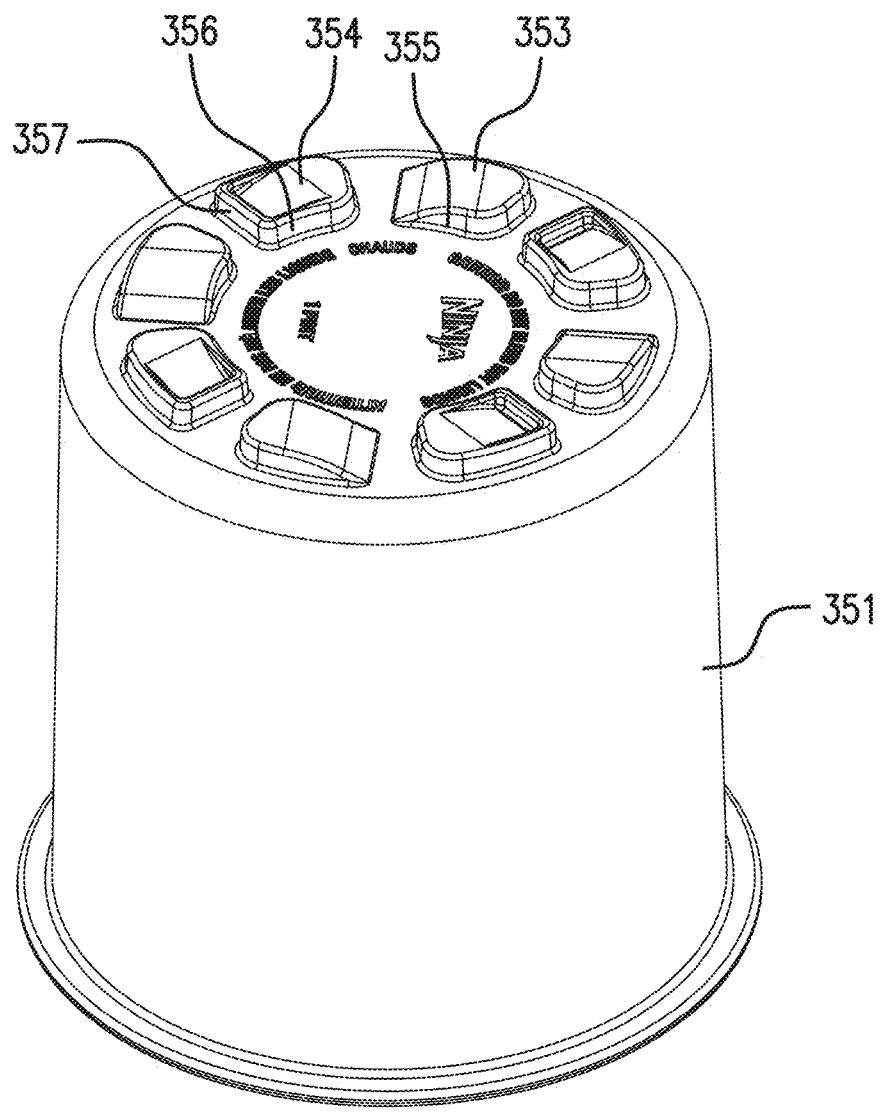
FIG. 20 is an isometric view of the exterior of the beaker of the bowl assembly.

FIG. 20 is an isometric view of the exterior of the beaker 351 and one or more alternating beaker alignment features 353, 354 on the bottom of the beaker 351. In an exemplary embodiment, a first type of beaker alignment features 353 have a peripheral wall 355 that meets the bottom surface of the beaker 351 at an angle. A second type of alignment features 354 have a peripheral wall 356 that creates a vertical face 357. Once the beaker 351 is joined with the outer bowl 352, the vertical face 357 prevents rotation of the beaker 351 inside the outer bowl 352 when the moving blade assembly 300 is operating during use of the device.

The beaker alignment features 353, 354 also aid in the fixing of frozen ingredients within said beaker 351. The beaker alignment features 353, 354 prevent such ingredients from rotational movement within the beaker 351 in the direction of the moving blade assembly 300 during use. It will be appreciated that in one embodiment, the beaker 351 can be manufactured from a disposable material to enhance the convenience of using the device 10. Further, the beaker 351 can be sold as a stand alone item, and further can be prefilled with ingredients to be processed during use of the device 10.

Figure 21:
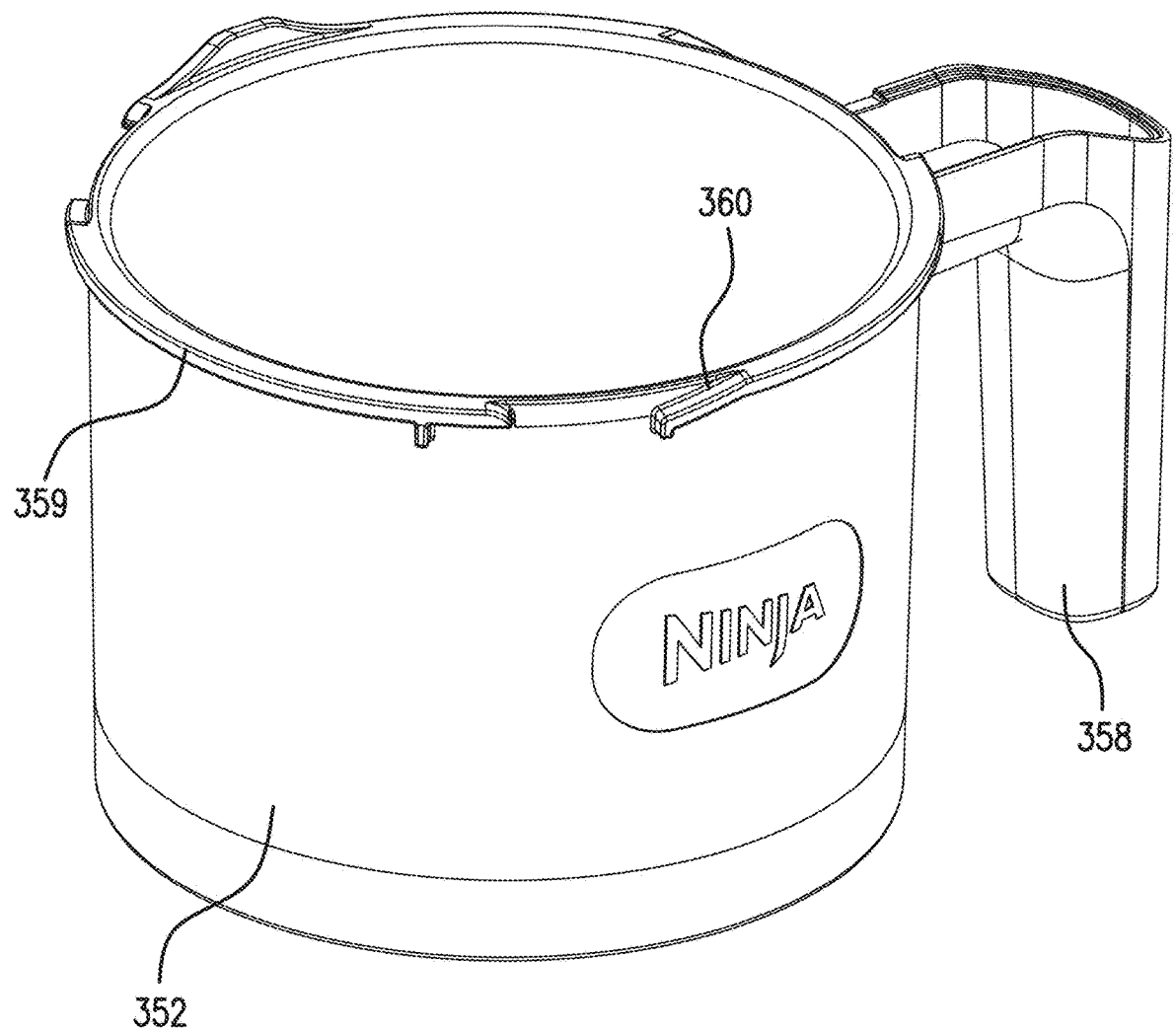
FIG. 21 is an isometric view of the outer bowl of the bowl assembly.
Figure 22:
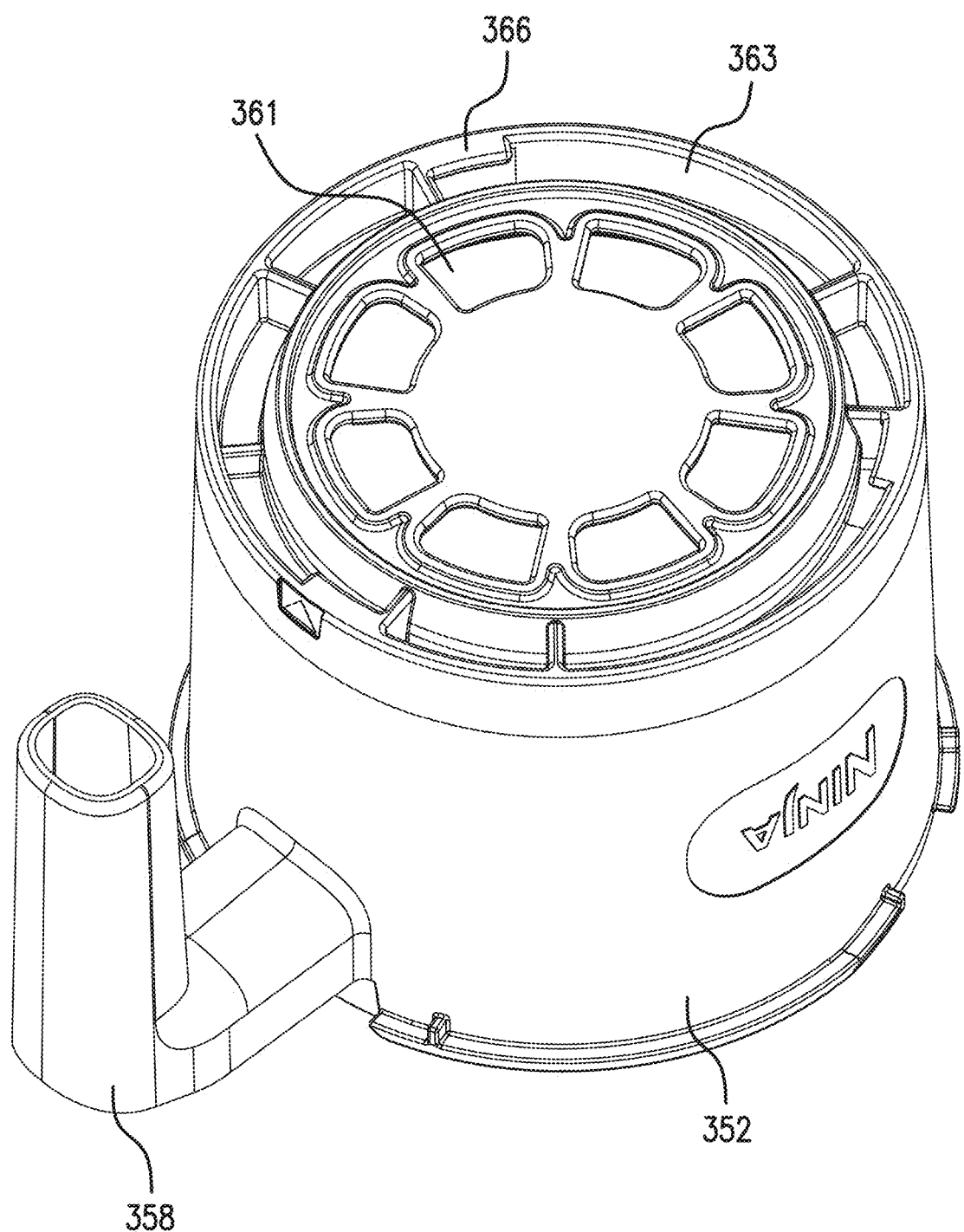
FIG. 22 is an isometric view of the bottom of the outer bowl.

FIG. 21 is an isometric view of the outer bowl 352 comprising a handle 358. As noted above, the beaker 351 fits within the outer bowl 352. As can be seen in FIG. 22, the bottom of outer bowl 352 comprises one or more alignment features 361 that engage with the alignment features 353, 354 on the bottom of beaker 351. The vertical faces 357 of the beaker alignment features abut the outer bowl alignment features 361 to prevent the relative rotational movement of the beaker 351 within the outer bowl 352 during use of the device 10.

The outer bowl 352 further comprises lid locking features to attach the lid assembly 400 to the outer bowl by rotation. FIG. 21 shows an outwardly projecting lip 359 along a portion of the circumference of the outer bowl 352. The lip 359 is interrupted along the circumference of the outer bowl 352. One or more protrusions 360 extend in a downward biased position from the lip 359 at the point where the lip is interrupted. Lid assembly connectors 373 travel along the lip 359 during rotation of the lid assembly 400 onto the outer bowl 352. The protrusion 360 acts as a ramp for said connectors 373. When the end of the protrusion 360 is reached, the lid assembly connectors 373 occupy the aforementioned spaces existing along the lip 359.

Figure 23:
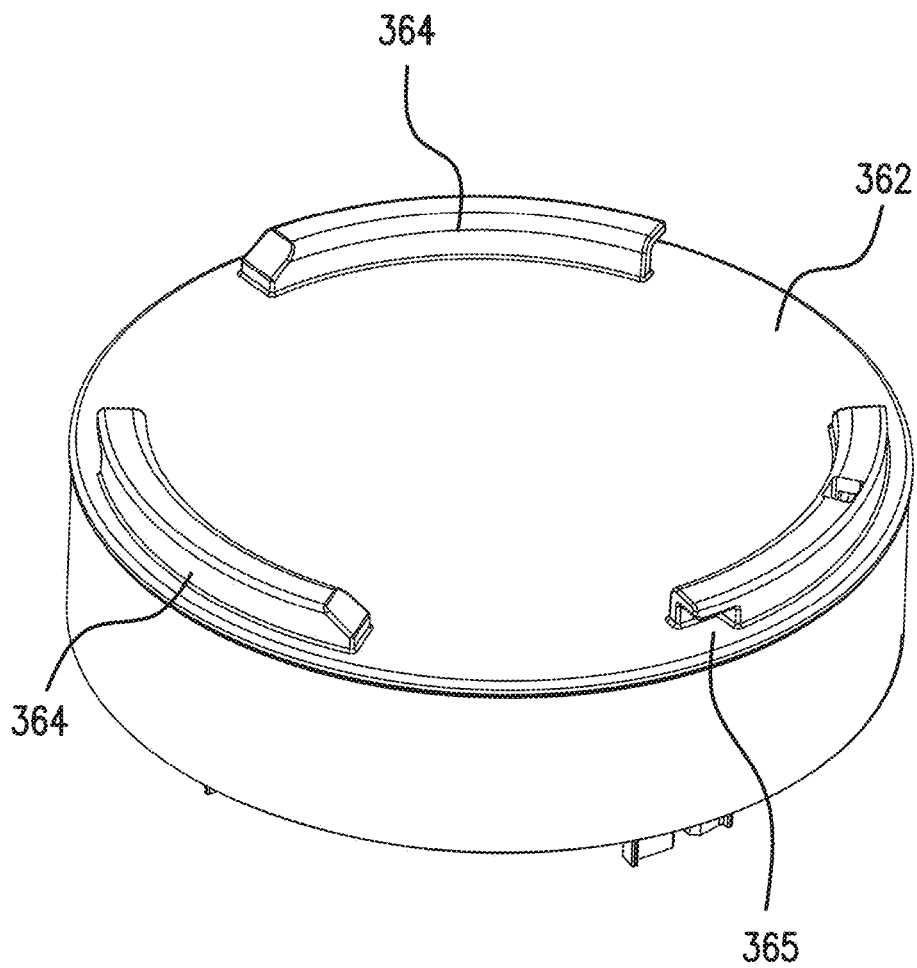
FIG. 23 is an isometric view of the exterior of the lifting platform.
Figure 24:
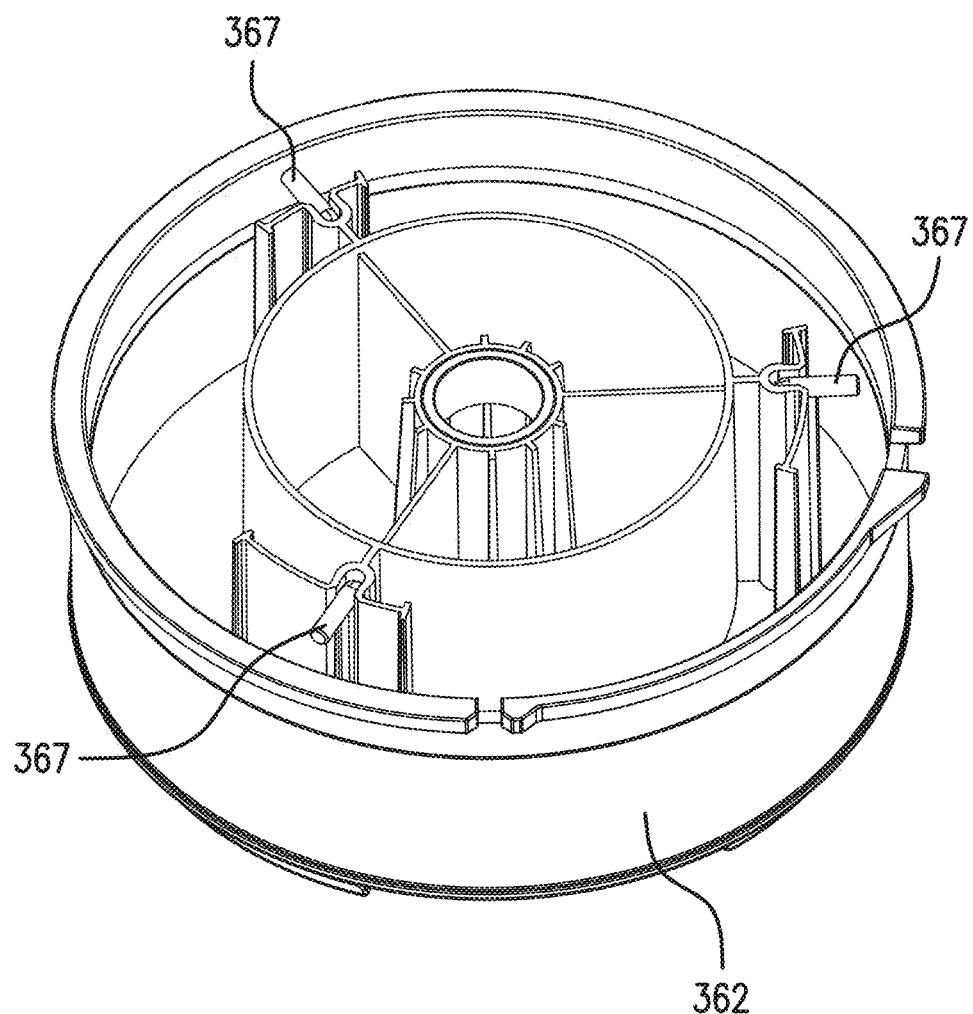
FIG. 24 is an isometric view of the interior of the lifting platform.

FIG. 23 is an isometric view of the top of the lifting platform 362. FIG. 24 is an isometric view of the interior of the lifting platform 362. The outer bowl 352 comprises locating and locking elements for positioning and connecting the outer bowl 352 to the top of the lifting platform 362. As can be seen in FIG. 22 and FIG. 23, the underside of the outer bowl 352 comprises one or more indentations 363 sized to receive corresponding projections 364 on the top of said lifting platform 362. At least one such projection on the top of said lifting platform 362 comprises a cutaway 365 (FIG. 23) to receive a corresponding ledge 366 (FIG. 22) on the outer bowl 352 when the outer bowl 352 is rotated on the lifting platform 362, locking the outer bowl 352 and the lifting platform 362 together.

Figure 25B:
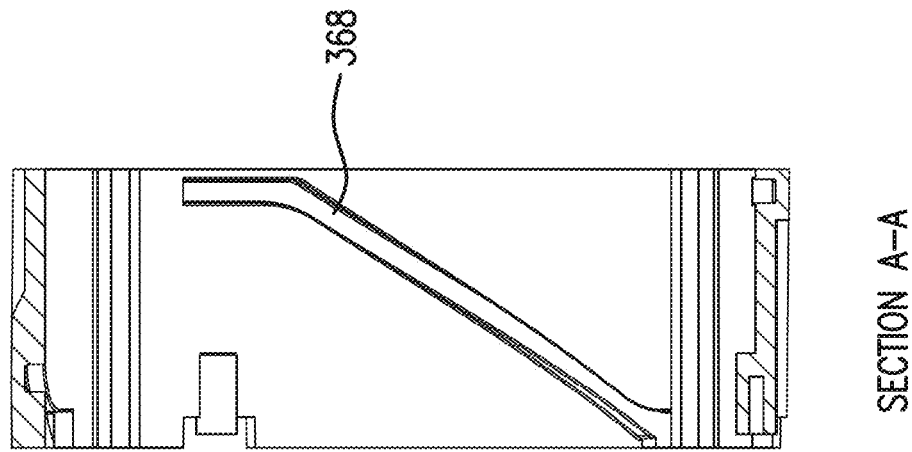
FIG. 25B is a sectional view of the cam path tubular insert along section A-A of FIG. 25A.
Figure 25A:
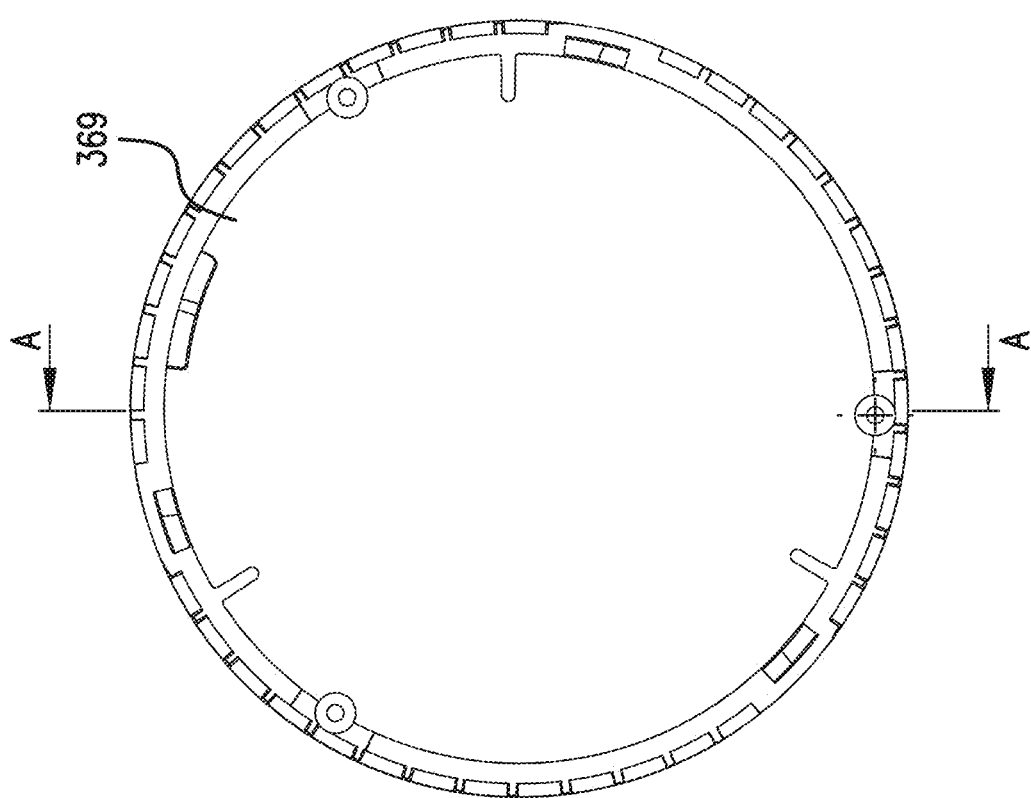
FIG. 25A is a plan view of the cam path tubular insert.
Figure 26:
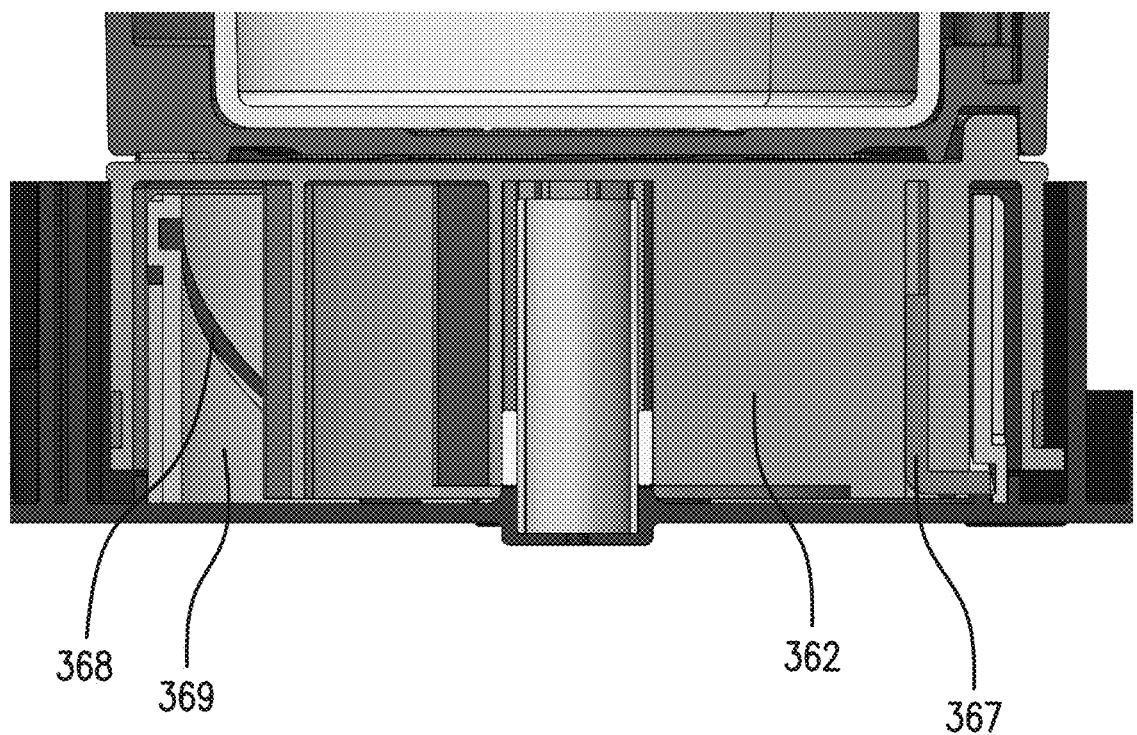
FIG. 26 is a sectional view of the cam path tubular insert inside the lifting platform.

Referring to FIG. 24 and FIG. 25, the interior of lifting platform 362 further comprises one or more pins 367. The pins 367 follow a cam path 368 located on the interior wall of a cam path tubular insert 369 positioned inside the lifting platform 362. FIG. 26 is a cutaway view showing the cam path tubular insert 369 positioned within the lifting platform 362 with the bowl assembly 350 in the down position. When the bowl assembly 350 is locked to the lifting platform 362 and rotated via the handle 358, the pins 367 travel along the cam path 368, vertically raising the bowl assembly 350, lid assembly 400, and lifting platform 362, enabling the blade assembly 300 to engage with the power coupling 252.

Figure 27:
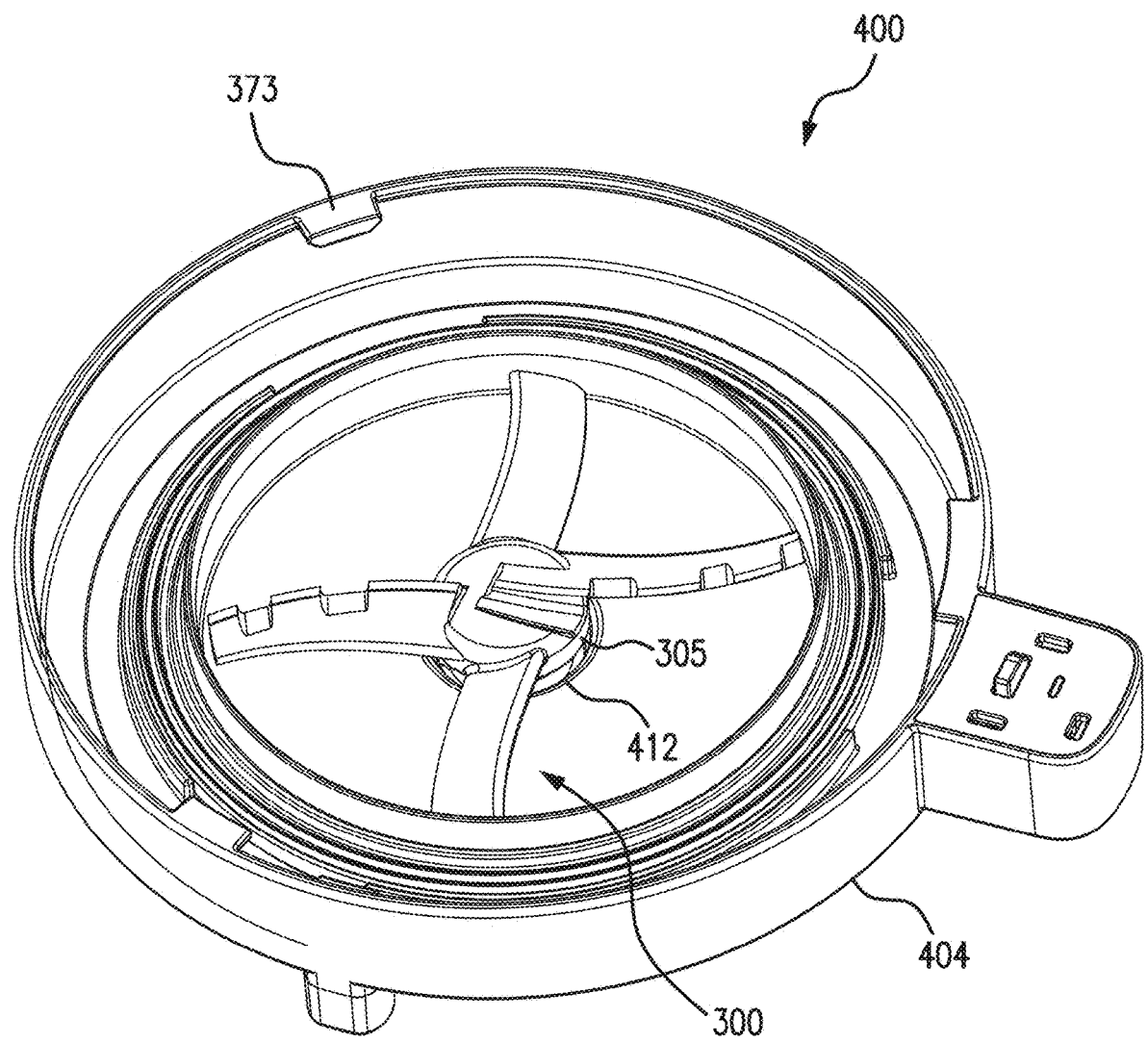
FIG. 27 is an isometric view of the underside of the lid assembly with a blade assembly installed therein.

Referring to FIG. 27, a view of the underside of the lid assembly 400 with a blade assembly 300 releasably retained therein is shown. The lid assembly 400 includes a lid 404, a clip release lever 406, and a primary set of clips 408. The central support hub 305 of the blade assembly 300 is inserted into a central aperture 412 of the lid assembly 400.

Figure 28:
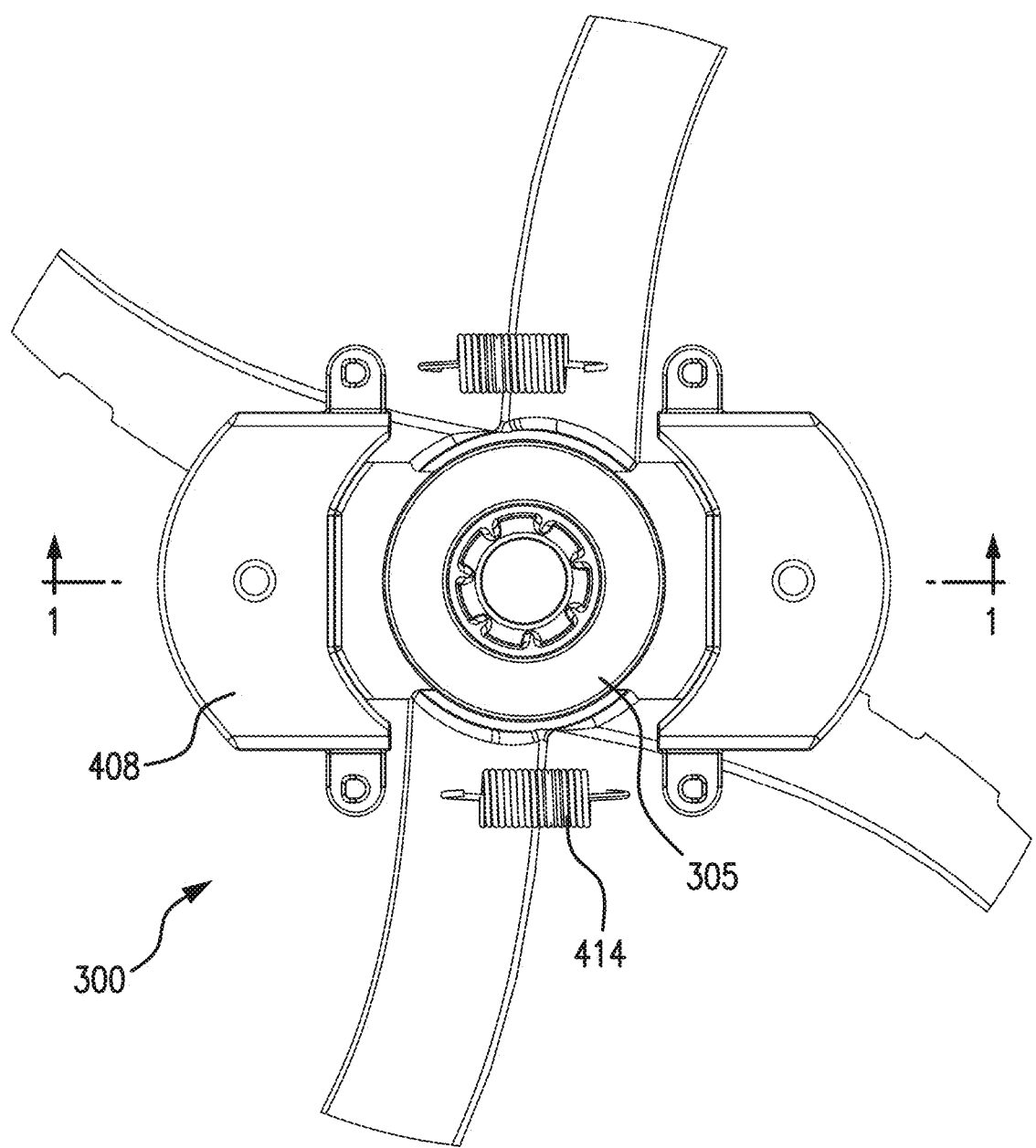
FIG. 28 is top view of the blade assembly and spring-biased primary sets of clips.

Referring now to FIG. 28, an isolated overhead view of the blade assembly 300 and the primary set of clips 408 is shown. The primary set of clips 408 are spring biased toward the central support hub 305 by at least one spring 414. The spring(s) 414 are shown unattached and in the compressed state in FIG. 28. In normal use, however, the spring(s) 414 are extended and attached to opposing primary clips 408 such that the spring(s) 414 tend to pull the opposing primary clips 408 toward each other.

Figure 29:
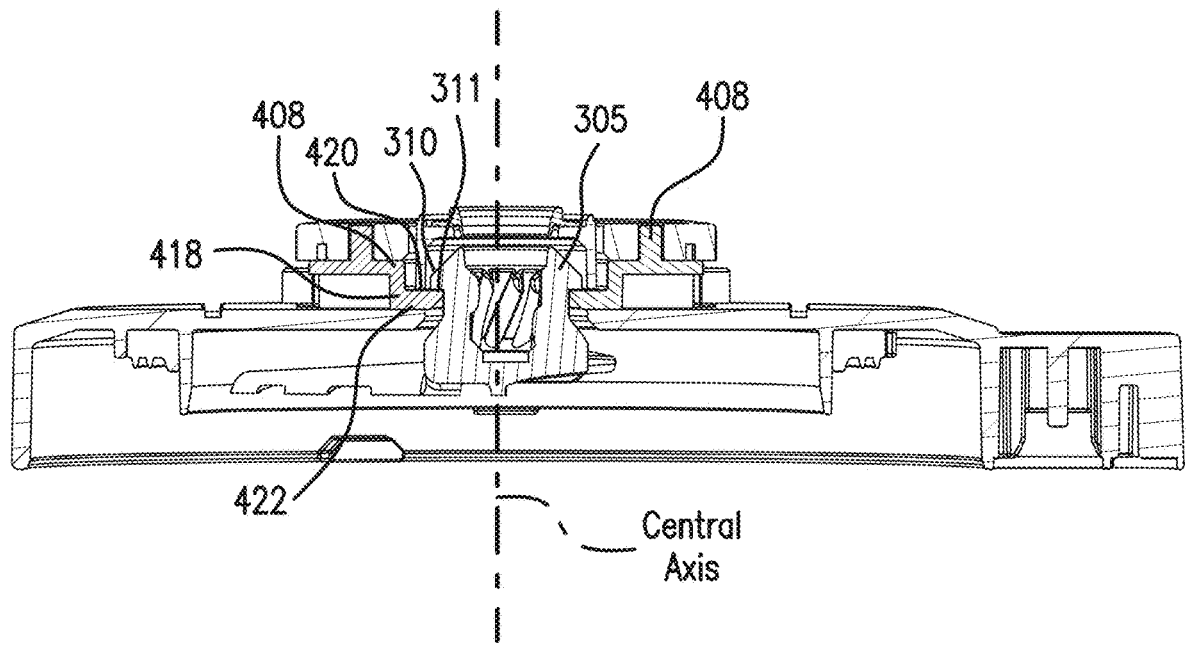
FIG. 29 is a side cross-sectional view of FIG. 28 along line 1-1 with additional features of the lid assembly shown.
Figure 30:
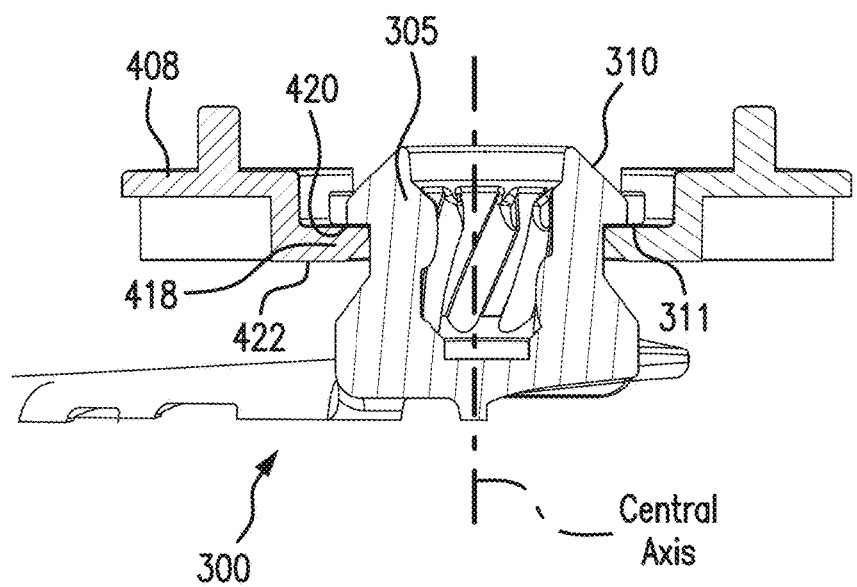
FIG. 30 is an enlarged view of the interaction between the primary set of clips and the blade assembly.

Referring now to FIGS. 29 and 30, the primary set of clips 408 are shown engaged with the central support hub 305. The central support hub 305 includes an external angled ledge 310 and an external undercut 311. Each primary clip in the set 408 includes a primary engagement structure 418 that includes a primary upper retention surface 420 and a primary lower surface 422. Although two primary clips 408 are shown in the embodiment, more or fewer than two clips can be utilized.

During the connection process, when the central support hub 305 of the blade assembly 300 is positioned in lid assembly 400, the primary lower surfaces 422 engage with the external angled ledge 310 of the central support hub 305. The primary lower surfaces 422 contact the external angled ledge 310 of the central support hub 305 and, when the blade assembly is pressed into the lid assembly 400, the primary lower surfaces 422 engage the external angled ledge 310 and tend to urge the primary set of clips 408 to move outwards against the force of the spring(s) 414. The outward movement of the primary set of clips 408 allows the primary engagement structures 418 to pass by the outside of the central support hub 305. When a blade assembly 300 is not located in the lid assembly 400, the primary set of clips 408 are urged by the spring(s) 414 to a rest position that is further inward than shown in, e.g., FIG. 30.

As shown in FIGS. 29 and 30, after the primary engagement structures 418 travel past the outside of the central support hub 305, the primary engagement structures 418 then enter the external central support hub undercut 311. The spring(s) 414 urge the primary set of clips 408 toward, and remain in, an engaged position. The external central support hub undercut 311 has a generally flat surface that extends radially outward at an approximately 90-degree angle relative to the central axis of the blade assembly 300. Similarly, the primary upper retention surface 420 is preferably angled such that it engages with the external central support hub undercut 311 in a manner that retains the blade assembly 300 in the lid assembly 400 even in the event that significant disengagement forces are applied to the blade assembly 300.

Figure 31C:
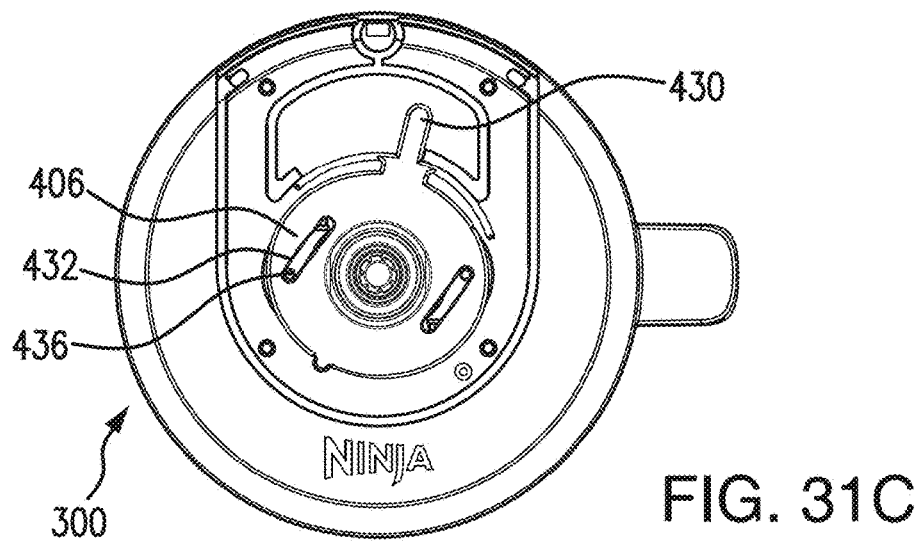
FIG. 31C is an overhead view of the lid assembly with the clip release lever in the fully-rotated position.
Figure 31B:
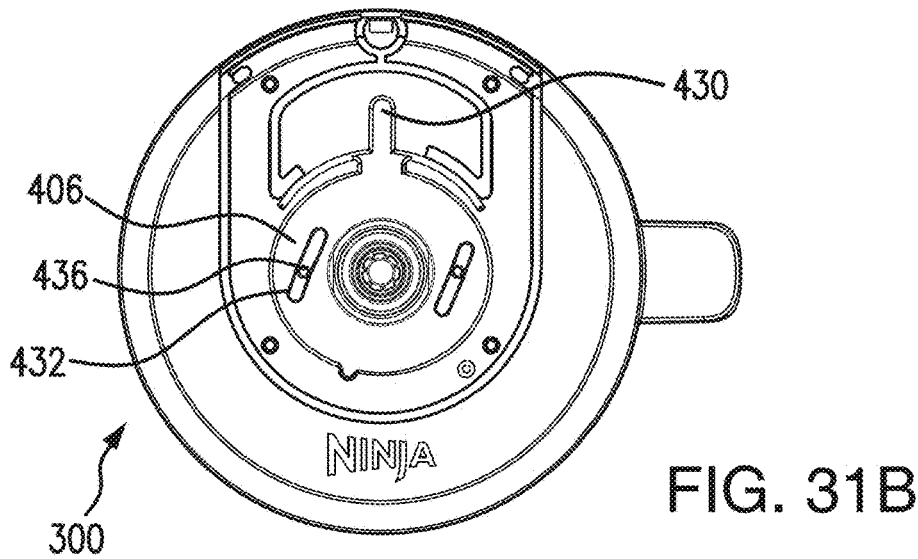
FIG. 31B is an overhead view of the lid assembly with the clip release lever in approximately a mid-way rotated position.
Figure 31A:
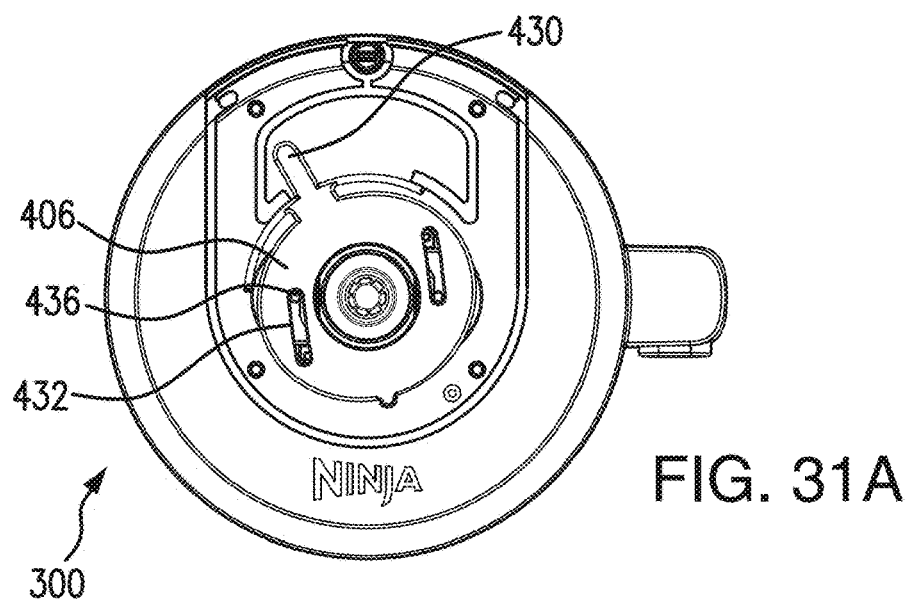
FIG. 31A is an overhead view of the lid assembly with the clip release lever in the home position.

Referring now to FIGS. 31A-C, the lid assembly 400 also includes a clip release lever 406. The clip release lever 406 is retained on the remainder of the lid assembly 400 in a manner such that it can move rotationally relative to the remainder of the lid assembly 404 within a pre-determined range of motion. The embodiment shown permits rotation from a home position (0-degrees of rotation) to a fully-rotated position. In the embodiment shown, the clip release lever 406 includes a lever arm 430 and primary lever engagement surfaces 432. Therefore, motion of the clip release lever 406 directly imparts motion on the primary set of the clips 408, and vice versa, as shown sequentially in FIGS. 31A, 31B and 31C.

The primary lever engagement surfaces 432 engage with the pins 436 of the primary set of clips 408 during at least some portion of the rotation of the clip release lever 406. The primary lever engagement surface 432 acts to move the primary set of clips 408 from the home position where the primary set of clips 408 are fully spring biased toward each other and are in the rest position (FIG. 31A) to a fully-rotated position where the primary set of clips 408 are retracted away from each other (FIG. 31C). As shown, the primary lever engagement surfaces 432 are located on an inner surface of opposing angled slots on the clip release lever 406 and engage with pins 436 on each of the primary clips 408 during at least a portion of the rotational travel of the clip release lever 406. In the present embodiment, the primary set of clips 408 are spring biased toward the central hub support 305 when a blade assembly 300 is positioned in lid assembly 400. In the present embodiment, the clip release lever 406 is in the mid-way position (see FIG. 31B), which is approximately half-way between the home position (FIG. 31A) and the fully-rotated position (FIG. 31C), when a blade assembly 300 is positioned in the lid assembly 400. Once the clip release lever 406 has been rotated past the position shown in FIG. 31B, the primary set of clips 408 begin to retract from the central support hub 305 until the primary set of clips 408 are fully retracted and cease retaining the blade assembly 300 in the lid assembly 400. When the clip release lever 406 is in the fully-rotated position (FIG. 31C), the primary set of clips 408 are retracted outward to a position outside of the central support hub 305, allowing the blade assembly 300 to be disengaged from the lid assembly 400, if desired. Likewise, in the position shown in FIG. 31C, the blade assembly 300 can also be installed into the lid assembly 400.

Figure 32:
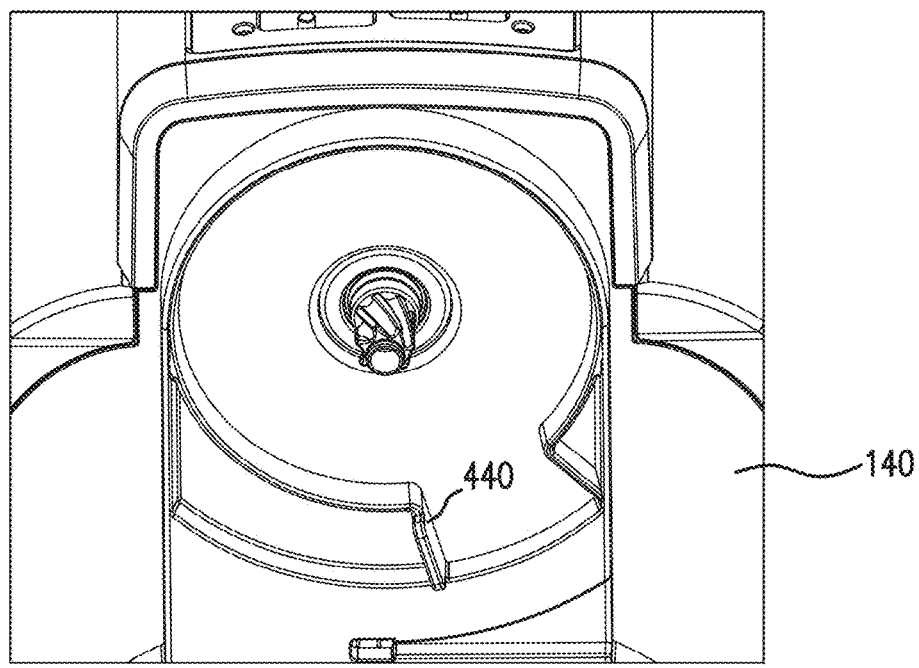
FIG. 32 is a partial isometric view of the underside of the upper housing.
Figures 33A, 33B:
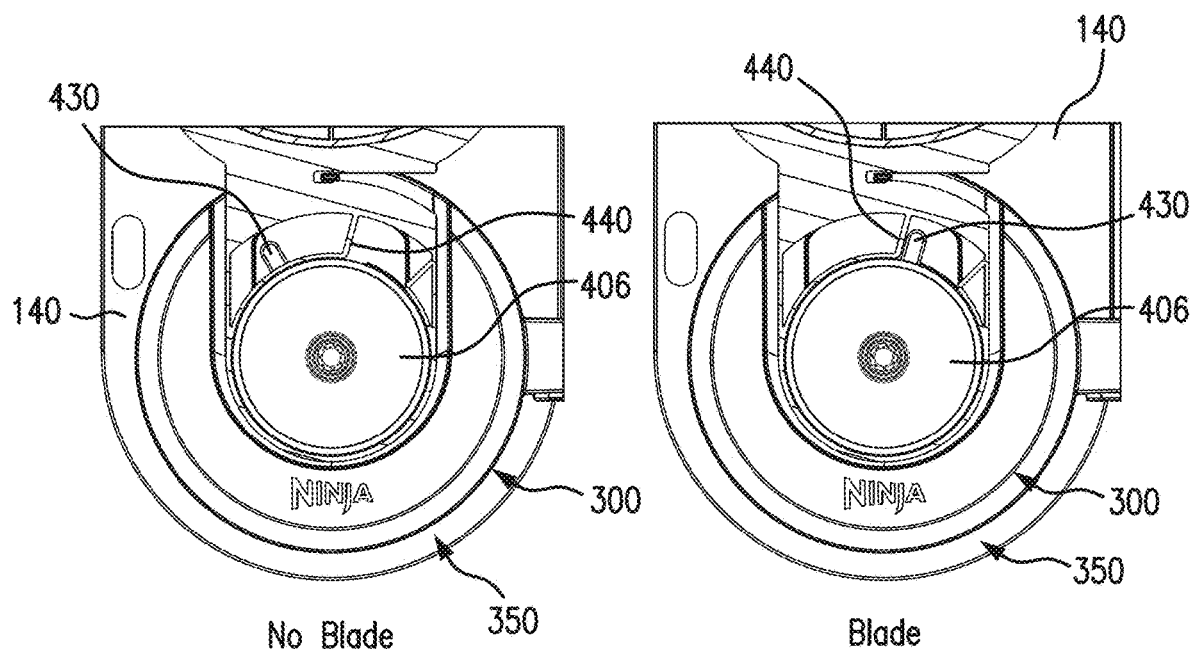
FIG. 33A is a schematic view of the interaction between the clip release lever and the clip lever contact ledge during installation when no blade is present.
FIG. 33B is a schematic view of the interaction between the clip release lever and the clip lever contact ledge during installation when a blade is properly installed.

Referring now to FIGS. 32, 33A, and 33B, the upper housing 140 includes a clip lever contact ledge 440. During the installation of the bowl assembly 350 and the lid assembly 400 onto the lower housing 100, the bowl and lid assemblies 350, 400 are placed on the lifting platform 360 and rotated relative to the lower base 100. As the installation of the bowl assembly 350 and the lid assembly 400 takes place, the lid assembly 400 rises upwards as it rotates relative to the lower base 100. In the event that the blade assembly 300 is properly installed in the lid assembly 400, the clip release lever 406 will rise to a height necessary to contact the clip lever contact ledge 440 during its rotation (see FIG. 33B). Conversely, in the event the blade assembly 300 is not installed in the lid assembly 400, the clip release lever 406 will not rise to the height necessary to contact the clip lever contact ledge 440 (FIG. 33A) and the clip release lever will rotate past the ledge 440. In instances where the clip release lever 406 contacts the clip lever contact ledge 440, the rotation of the clip release lever 406 relative to the lower base 100 will halt, and the clip release lever 406 will commence rotation relative to the remainder of the lid assembly 400. In instances where the clip release lever 406 does not contact the clip lever contact ledge 440, the rotation of the clip release lever 406 relative to the lower base 100 will continue, and the clip release lever 406 will continue to rotate with the remainder of the lid assembly 400 relative to the lower base 100. Therefore, the clip release lever 406 will be in a different position when the bowl assembly 650 and lid assembly 400 are fully installed depending on whether a blade assembly 300 is installed or not. In some embodiments, the final position of the clip release lever 406 when the bowl assembly 350 and lid assembly 400 are installed can be detected by the device to determine whether to operate as intended, or to indicate to the user that the blade assembly 300 is not properly installed.

In order for the power shaft 250 to properly connect to the blade assembly 300 during installation, the blade assembly 300 must be seated properly in the lid assembly 400 both prior to and immediately after completion of the connection to the power shaft 250. In order to detect proper location of the blade assembly 300, the device 10 can further include a blade assembly detection mechanism 450 that detects the positioning of the blade assembly 300. For example, the system can utilize optical, mechanical and/or electrical means. Further examples of a blade assembly detection mechanism 450 are described with reference to FIGS. 36-40B.

In operation, a user places ingredient(s) inside the beaker 351 and then into a freezer until the ingredients are brought to the appropriate temperature; typically, the temperature is sub-freezing. The beaker 351 holding the frozen ingredients is then placed into the outer bowl 352. The blade assembly 300 is inserted into the lid assembly 400 such that the external central hub undercut engages the spring-biased primary sets of clips 408. The installation of the blade assembly 300 into the lid assembly 400 causes the clip release lever to rotate from the home position (FIG. 31A) to the mid-way rotated position (FIG. 32B). The lid assembly 400 (with installed blade assembly 300) is then placed onto the beaker 351 and outer bowl 352 and, together, placed onto the lifting platform 360.

Figure 35A:
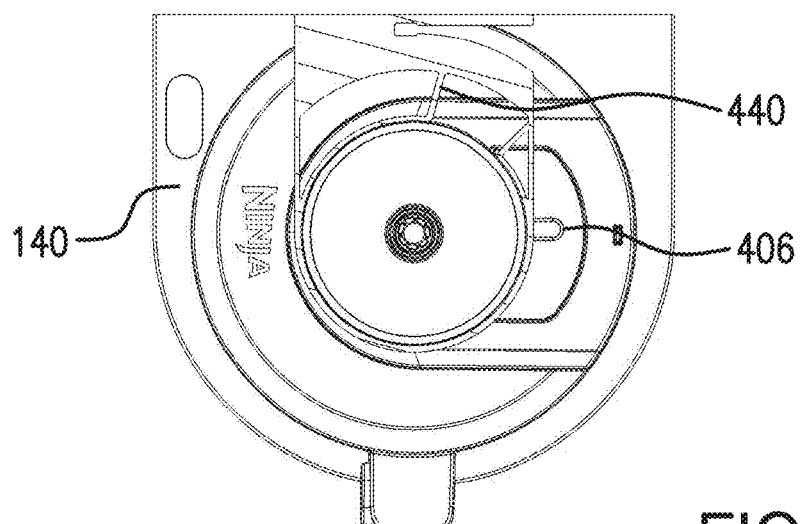
FIG. 35A is an overhead schematic view of the initial stages of installation of the bowl assembly and the lid assembly with a blade assembly properly installed in the lid assembly.
Figure 35B:
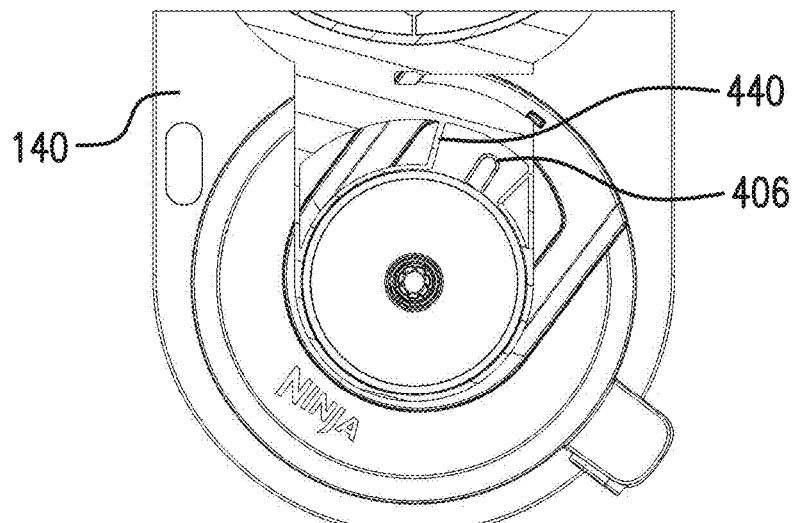
FIG. 35B is an overhead schematic view part way through the installation of the bowl assembly and the lid assembly with a blade assembly properly installed in the lid assembly.
Figure 35C:
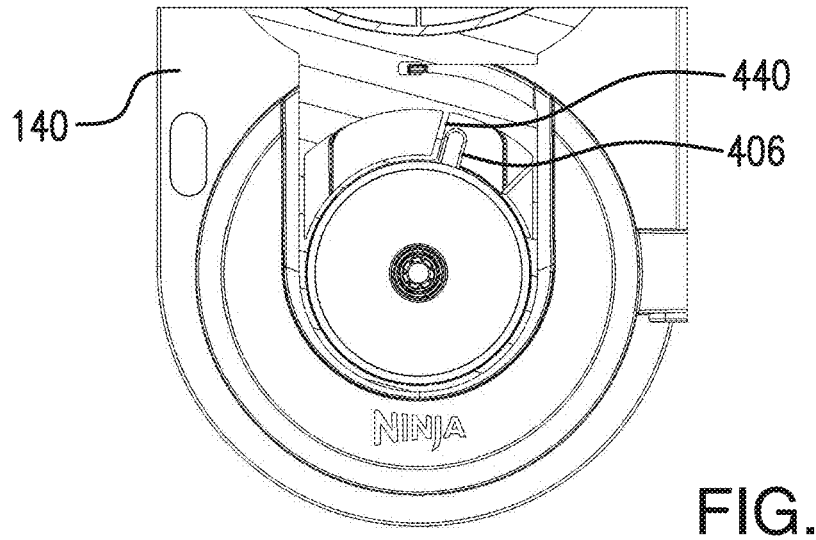
FIG. 35C is an overhead schematic view of the final stages of installation of the bowl assembly and the lid assembly with a blade assembly properly installed in the lid assembly.

The user then rotates the bowl and the lid assemblies 350, 400 relative to the lower base 100 such that the lifting platform 362 rises upwards, moving the blade and lid assemblies 350, 400 toward the power shaft 250 and power shaft coupling 254 until the connection is completed. During the rotation, the clip release lever 406 rises to a height necessary to contact the clip lever contact ledge 440 (FIG. 35B) which halts the rotation of the clip release lever 406 relative to the lower base 100 and causes rotation of the clip release lever 406 relative to the remainder of the lid assembly 400. Preferably, the lid assembly 400 and blade assembly 300 are raised to a height necessary for the power shaft 250/power shaft coupling 254 connection to be at least partially complete prior to the clip release lever contacting the ledge. More preferably, the power shaft 250/power shaft coupling 254 connection is fully complete prior to the clip release lever contacting the ledge. Once the power shaft 250/power shaft coupling 254 connection is complete, the magnet 258 on the power shaft 250 attaches to the blade assembly 300, retaining the blade assembly 300 in place. As the installation continues, the rotation of the clip release lever 406 relative to the remainder of the lid assembly 400 causes the primary set of clips 408 to disengage from the central support hub 305 of the blade assembly 300 while the bowl assembly 350 and remainder of the lid assembly 400 continue rotating until the installation is completed.

Figure 34A:
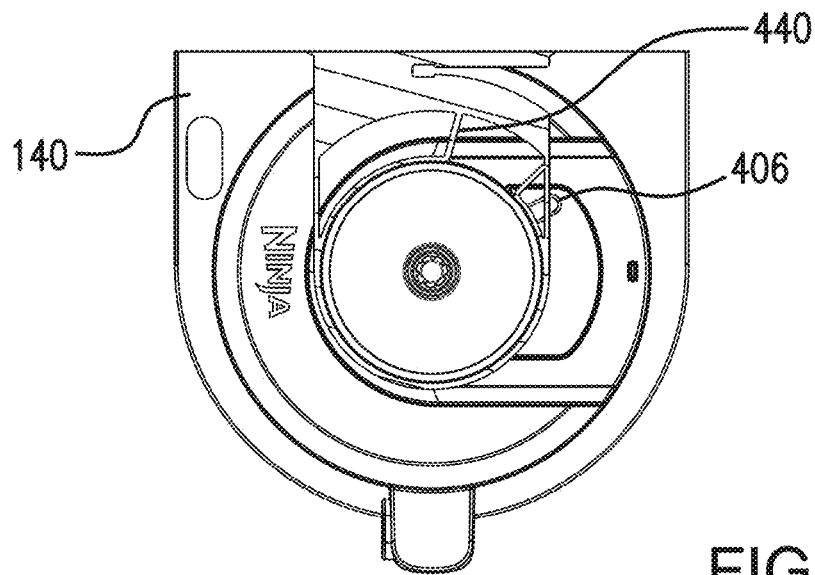
FIG. 34A is an overhead schematic view of the initial stages of installation of the bowl assembly and the lid assembly with no blade assembly installed in the lid assembly.
Figure 34B:
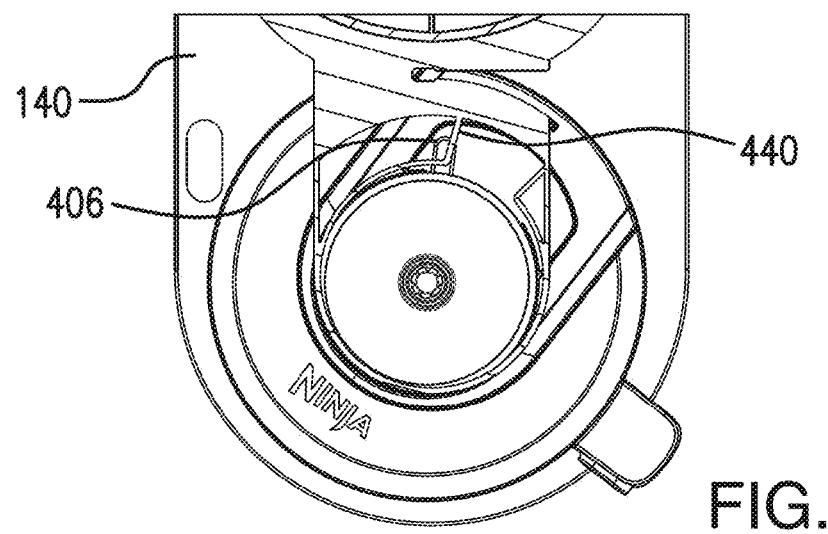
FIG. 34B is an overhead schematic view part way through the installation of the bowl assembly and the lid assembly with no blade assembly installed in the lid assembly.
Figure 34C:
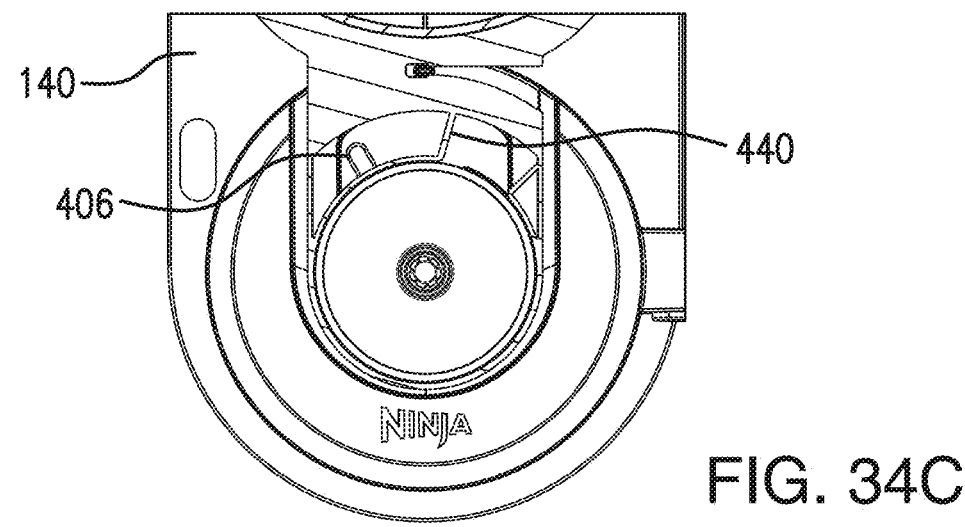
FIG. 34C is an overhead schematic view of the final stages of installation of the bowl assembly and the lid assembly with no blade assembly installed in the lid assembly.

In instances where the blade assembly 300 is not installed in the lid assembly 400 prior to installation of the bowl assembly 350 and lid assembly 400 into the device, the clip release lever 406 will be located in the home position at the commencement of the installation process. As the bowl assembly 350 and lid assembly 400 rotate on the lifting platform 360, the clip release arm 430 will, as shown in FIGS. 34A-C, pass under the ledge 440 prior to rising to the height necessary to contact the ledge 440. The clip release lever 406 will continue to rotate with the lid assembly 400 throughout installation, indicating to the device 10 and/or user that the blade assembly 300 is not installed, and the device 10 will not operate as expected.

In instances where the blade assembly 300 is properly installed in the bowl assembly 350 and lid assembly 400, the user may optionally select to operate the device 10 using a pre-determined program to produce a desired product using the user interface. Alternatively, a manual operation, where the user dictates the speed of the rotation of the blade, the rate of descent of the blade, and/or the depth the blade enters into the ingredient(s) (among other controllable parameters), can be carried out. The drive motor operates to turn the power shaft 250 and, accordingly, the blade assembly 300. As the blade assembly 300 turns, the cutting blades 301, 302 and mixing blades 303, 304 also begin to spin.

The position motor 260 operates to move drive motor assembly 240 and the blade assembly 300 upward and downward, based on the direction of operation. The now-spinning blade assembly 300 can then be plunged to a desired depth into the frozen ingredients at a desired spin rate and descent rate. As the blade assembly 300 spins in the frozen ingredients, the cutting blades 301, 302 operate to repeatedly cut through a thin layer of the frozen ingredients and the mixing blades 303, 304 operate to mix and smooth the loosened frozen ingredients.

After the blade assembly 300 has reached the desired lowest position in the frozen ingredients, the blade assembly 300 is then moved back upwards toward the lid assembly 400 by reversing the direction of the position motor 260. The blade assembly 300 can, optionally, be repeatedly plunged into the frozen ingredient(s) additional times. After the final plunge into the frozen ingredients, the position motor 260 is operated until the blade assembly 300 is returned to the lid assembly 400.

The user then rotates the bowl and lid assemblies 350, 400 relative to the lower base 100 in the opposite direction that was utilized during installation. The rotation of the bowl and lid assemblies 350, 400 permits rotation of the clip release lever 406 from the fully-rotated position to the midway rotated position and the primary set of clips 408 re-engage with the central support hub 305 of the blade assembly 300. The rotation of the bowl assembly and lid assemblies 350, 400 also causes the lifting platform 360 to move downwards toward the lower base 100. As the bowl and lid assemblies 350, 400 move downwards, the blade assembly 300 separates from the power coupling 252. The bowl and lid assemblies 350, 400 are then removed from the remainder of the device 10, and the lid assembly 400 (with the blade assembly 300 still installed therein) is removed from the bowl assembly 350. The now-processed ingredients can now be enjoyed.

The user can optionally rotate the clip release lever 406 to the fully rotated position, releasing the primary set of clips 408 from engagement with the central support hub 305. With both the primary sets of clips 408 released, the user can easily remove the blade assembly 300 from the lid assembly 400 for cleaning and/or storage.

Figure 36:
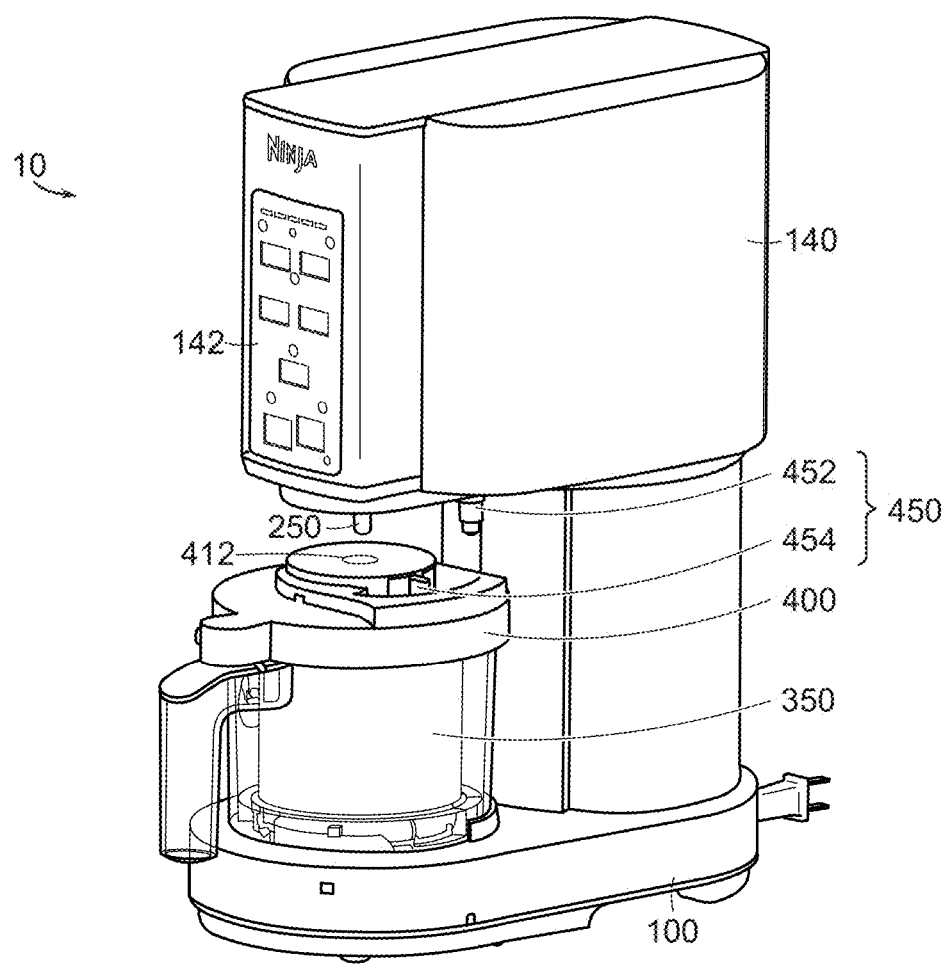
FIG. 36 is an isometric view of a device according to an exemplary embodiment of the present disclosure including a blade assembly detection mechanism.

FIG. 36 shows an isometric view of a device 10 according to an exemplary embodiment of the present disclosure further including a blade assembly detection mechanism 450. The blade detection mechanism comprises a sensor 452 and a blade detection mechanism 454, as further described below. As shown in FIG. 36, the device 10 includes a power shaft 250 positioned centrally above the central aperture 412 of the lid assembly 400, and a bowl assembly 350 positioned on a lower housing or base 100. The sensor 452 extends from the upper housing 140 and is located at about a 1 o'clock position relative to a user directly facing the interface 142. The blade position indicator 454 is located on a portion of the lid assembly 400 and comprises a material that emits a magnetic field—for example, a magnet. The sensor 452 in turn includes a hall effect sensor configured to detect a magnetic field in proximity to the sensor 452.

Figure 37:
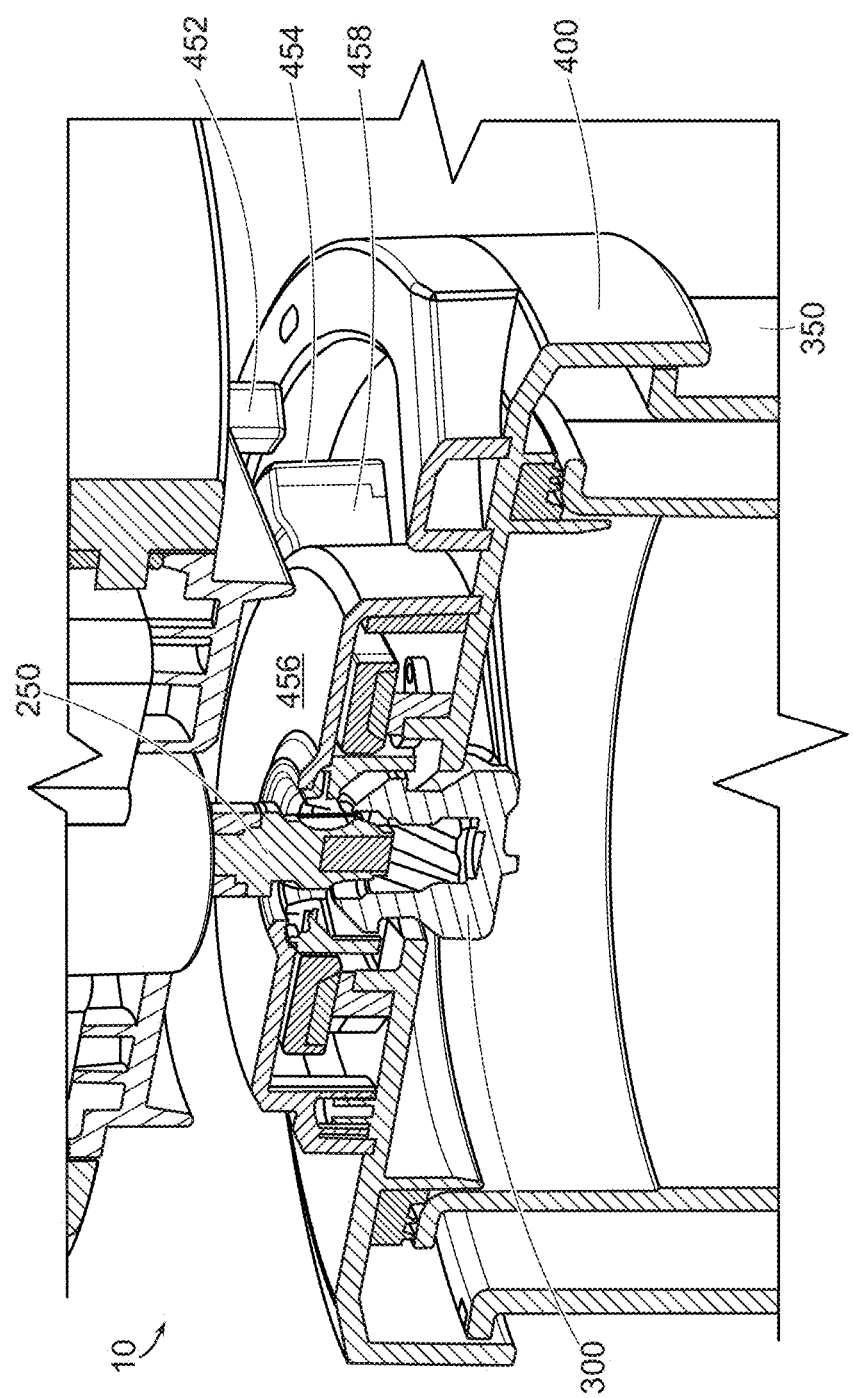
FIG. 37 is a side cross-sectional view of FIG. 36 with additional features of the blade assembly detection mechanism shown.

FIG. 37 shows a side cross-sectional view of the device 10 of FIG. 36. As shown in FIG. 37, the lid assembly 400 includes a connector 456 arranged to receive the blade assembly 300. The lid assembly 400 also includes an actuator arm 458 operably coupled to the connector 456 and arranged to change a position of the connector 456 to engage with or disengage from the blade assembly 300. The actuator arm 458 is in a first position (FIG. 38A) when the blade assembly 300 is engaged with the connector 456 and is in a second position (FIG. 41) when the blade assembly 300 is disengaged with the connector 456. The blade position indicator 454 is mounted at the end and/or on the top of the end of the actuator arm 458. Thus, the blade position indicator 454 is in the first position when the actuator arm 458 is in the first position and in a second position when the actuator arm 458 is in the second position.

In use, as a user rotates the bowl assembly 350 from the down position upward toward the power shaft 250, the blade position indicator 454 passes sufficiently close to the sensor 452 such that the sensor 452 momentarily detects the magnetic field emitted by the blade position indicator 454 and determines that the user has placed the blade assembly 300 within the lid assembly 400. If the user has not positioned the blade assembly 300 within the lid assembly 400, the blade position indicator 454 will not pass sufficiently close to the sensor 452 as the user rotates the bowl assembly 350 upward toward the power shaft 250. Therefore, the sensor 452 will not detect the magnetic field emitted by the blade position indicator 454. Importantly, the sensor 452 does not detect whether the power shaft 250 is engaged with the blade assembly 300. Instead, the sensor 452 only detects whether the blade assembly 300 is present in the lid assembly 400 before the lid assembly 400 reaches the power shaft 250 and before the power shaft 250 engages the blade assembly 300. Further discussion of these steps with reference to FIGS. 38A-41 continues below.

Figure 38A:
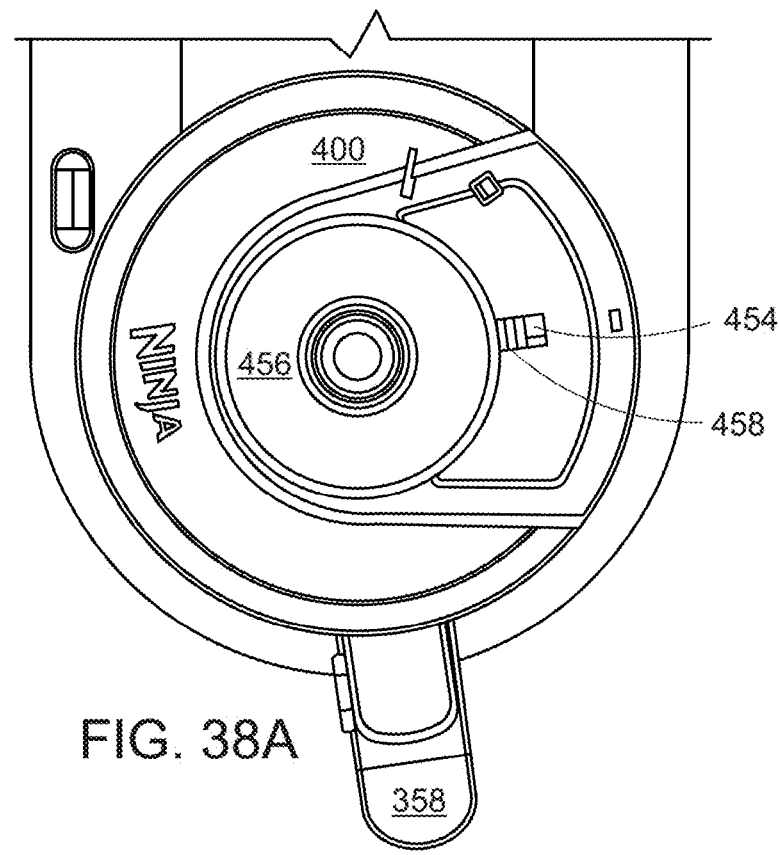
FIGS. 38A and 38B are top-down and side views respectively of the lid assembly and the power shaft position with the bowl assembly and the lid assembly in a down position.
Figure 38B:
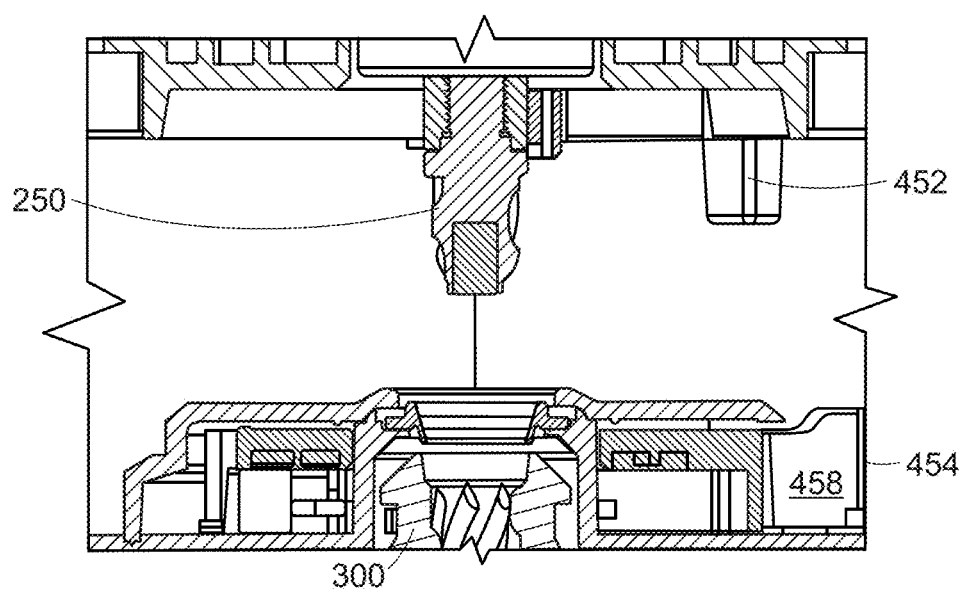

FIGS. 38A and 38B show top-down and side views respectively of the lid assembly 400 when the bowl assembly 350 is in the down position and the handle 358 is at about a 5 o'clock position relative to the user. The actuator arm 458 and the blade position indicator 454 are the first position, meaning that the user has placed the blade assembly 300 within the lid assembly 400. In this position, the blade position indicator is at about a 2:45 o'clock position relative to the user. In this configuration, the sensor 452 does not yet detect the blade position indicator 454.

Figure 39A:
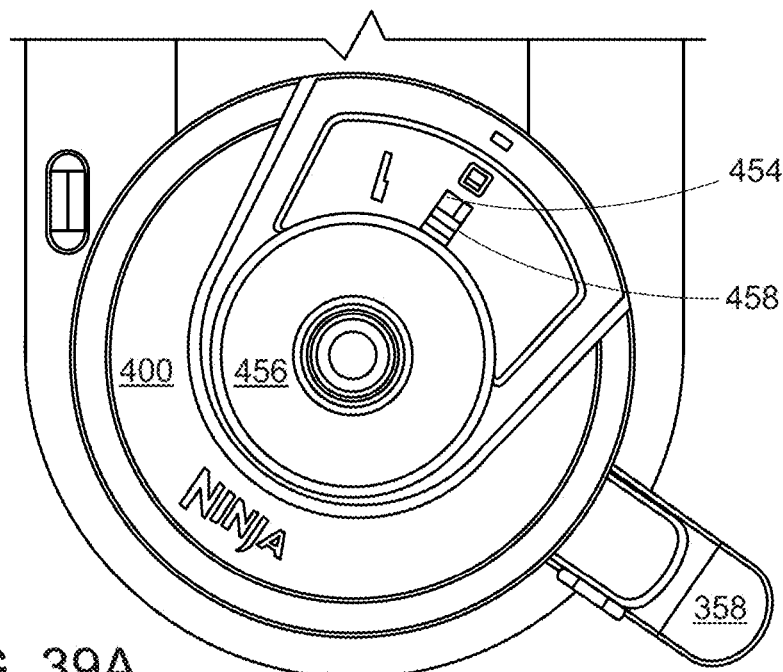
FIGS. 39A and 39B are top-down and side views respectively of the lid assembly and the power shaft position while the blade position indicator is adjacent to the sensor and the blade assembly is detected.

FIG. 39A shows the position of the blade position indicator 454 when the user has partially rotated the bowl assembly 350 upwards toward the power shaft 250, such that the handle 358 is now at about a 4 o'clock position. In this configuration, the blade position indicator 454 is at about the 1 o'clock position relative to the user. Thus, the blade position indicator 454 passes sufficiently close to the sensor 452 to enable the sensor 452 to detect the blade position indicator 454. An indicator (for example, a flashing light on the interface 142) indicates to the user that the user has properly placed the blade assembly 300 within the lid assembly 400.

Figure 39B:
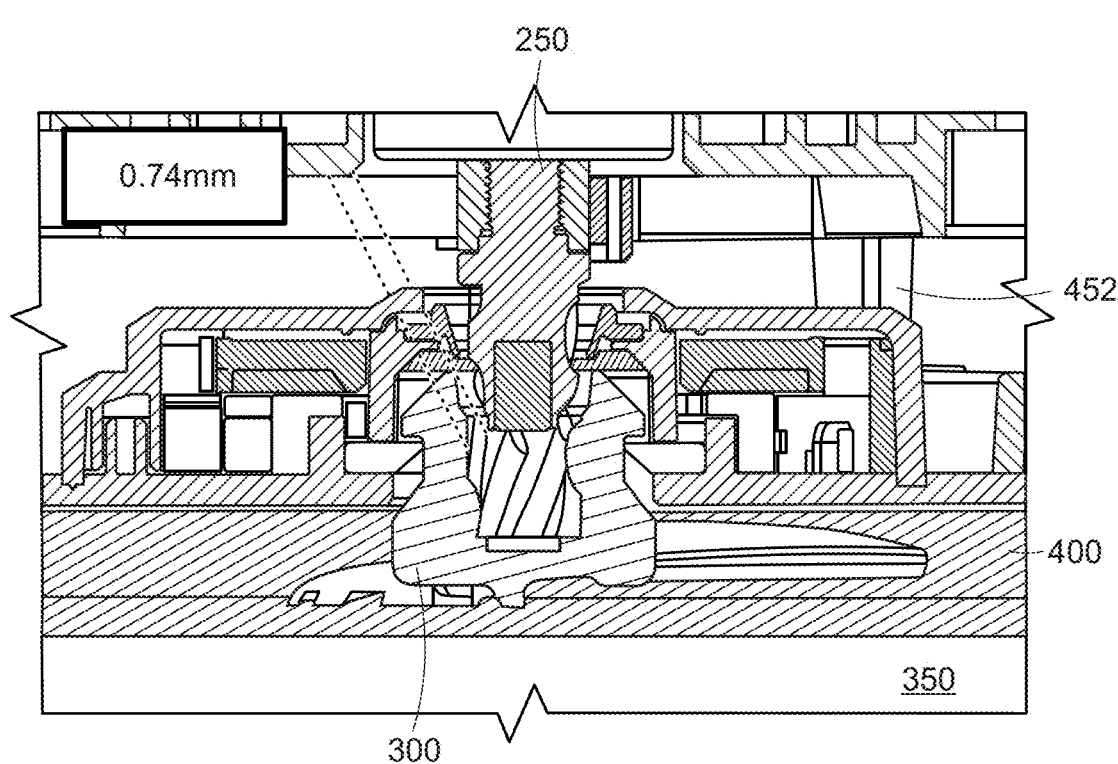

FIG. 39B further shows that, when the blade position indicator 454 is at about the 1 o'clock position, the power shaft 250 has not yet engaged with the blade assembly 300 and is at a distance (for example, about 0.74 mm away) from beginning to engage with the blade assembly 300. FIG. 39B thus illustrates how the sensor 452 detects the presence of the blade assembly 300 in the lid assembly 400, but not whether the power shaft 250 is connected to or engaged with the blade assembly 400.

Figure 40A:
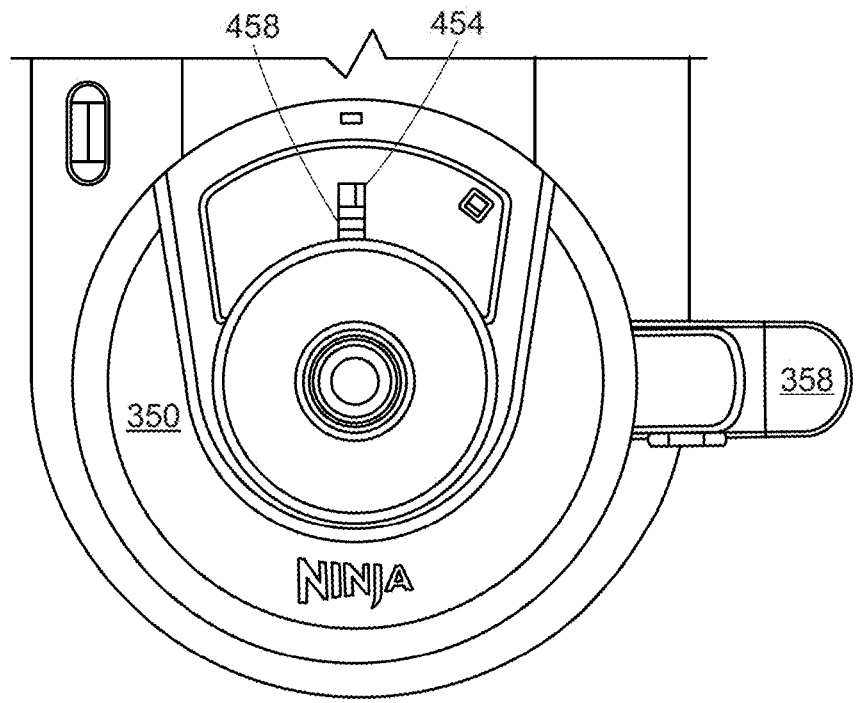
FIGS. 40A and 40B are top-down and side views respectively of the lid assembly and the power shaft position with the bowl assembly and the lid assembly in an up position.
Figure 40B:
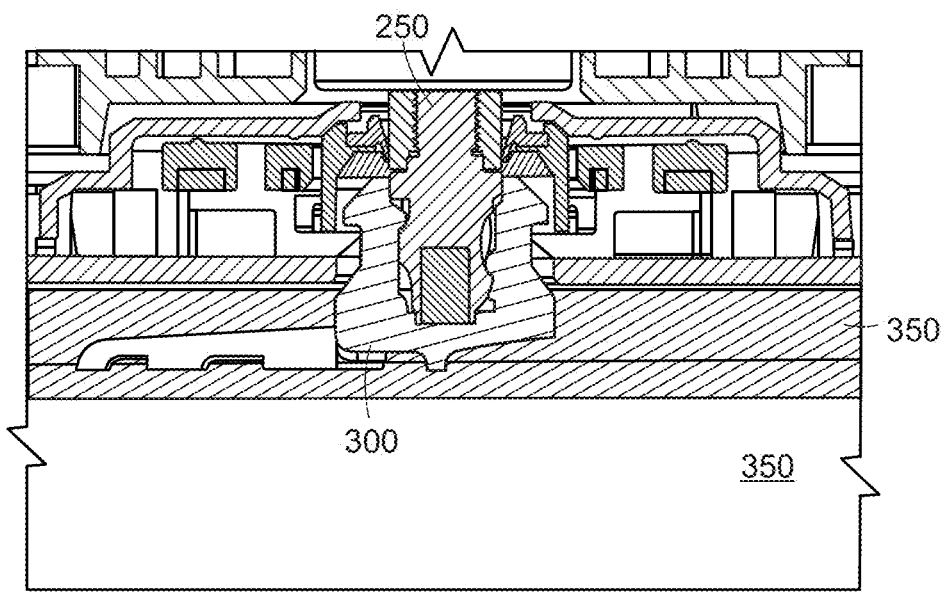

FIGS. 40A and 40B are top-down and side views respectively of the lid assembly 400 when the bowl assembly 350 is in the up position and the handle 358 is at about a 3 o'clock position relative to the user. In this configuration, the blade position indicator 454 is at about the 12 o'clock position relative to the user and the power shaft 250 is fully engaged with the blade assembly 300. In this position, the sensor 452 no longer detects the blade position indicator 454.

Figure 41:
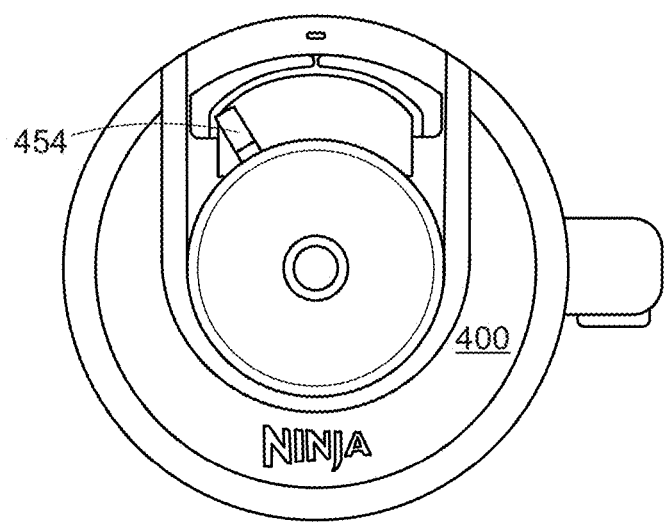
FIG. 41 is a top-down view of the lid assembly when the blade assembly has not been installed in the lid assembly.

Notably, as shown in FIG. 41, when the user has not installed the blade assembly 300 in the lid assembly 400 and after the user has rotated the bowl assembly 350 from the down position to the up position, the blade position indicator 454 is in the second position—i.e., at about a 10 o'clock position relative to the user. This configuration enables the blade position indicator 454 to pass under and sufficiently away from the sensor 452 such that the sensor 452 does not detect the blade position indicator 454 as the user rotates the bowl assembly 350 from the down position to the up position.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

The invention claimed is:

1. A blade assembly detection system for a micro puree machine comprising:
  a bowl assembly;
  a lid assembly configured to be secured to the bowl assembly, the lid assembly comprising:
    a connector arranged to engage with and disengage from a blade assembly;
    an actuator arm operably coupled to the connector and arranged to move between a first actuator position and a second actuator position to move a position of the connector to engage with or disengage from the blade assembly;
    a blade position indicator mounted on a portion of the actuator arm, the blade position indicator comprising a magnetic material arranged to emit a magnetic field, the blade position indicator being in a first indicator position when the actuator arm is in the first actuator position and in a second indicator position when the actuator arm is in the second actuator position; and
  a sensor arranged to detect the magnetic field of the blade position indicator;
  wherein the bowl assembly is configured to be rotated between a down position and an up position by a user.

2. The blade assembly detection system of claim 1, wherein the sensor is a hall effect sensor.

3. The blade assembly detection system of claim 1, wherein the sensor is at about a 1 o'clock position relative to a user directly facing an interface of the micro puree machine.

4. The blade assembly detection system of claim 1, wherein the blade position indicator is at about a 2:45 o'clock position relative to the user when the bowl assembly is in the down position and the blade position indicator is in the first indicator position.

5. The blade assembly detection system of claim 1, wherein the blade position indicator is at about a 1 o'clock position relative to the user when the bowl assembly is partially rotated from the down position to the up position and the blade position indicator is in the first indicator position.

6. The blade assembly detection system of claim 1, wherein the blade position indicator is at about a 12 o'clock position relative to the user when the bowl assembly is in the up position and the blade position indicator is in the first indicator position.

7. The blade assembly detection system of claim 1, wherein the blade position indicator is at about a 10 o'clock position relative to the user when the bowl assembly is in the up position and the blade position indicator is in the second indicator position.

8. The blade assembly detection system of claim 1, wherein the actuator arm is in the first actuator position when the blade assembly is engaged with the connector and is in the second actuator position when the blade assembly is disengaged from the connector.

9. The blade assembly detection system of claim 1, wherein the blade position indicator is mounted on an end of the actuator arm.

10. The blade assembly detection system of claim 1, wherein the sensor is positioned in relation to the lid assembly such that the sensor detects the magnetic field when the blade position indicator is in the first indicator position and does not detect the magnetic field when the blade position indicator is in the second indicator position.

* * * * *